(12) United States Patent
Pearson

(10) Patent No.: US 7,536,276 B2
(45) Date of Patent: May 19, 2009

(54) METHOD AND APPARATUS FOR EQUIPMENT HEALTH MONITORING

(75) Inventor: Scott Allan Pearson, Grayslake, IL (US)

(73) Assignee: Siemens Buildings Technologies, Inc., Buffalo Grove, IL (US)

( * ) Notice: Subject to any disclaimer, the term of this patent is extended or adjusted under 35 U.S.C. 154(b) by 221 days.

(21) Appl. No.: 11/681,946

(22) Filed: Mar. 5, 2007

(65) Prior Publication Data
US 2008/0027568 A1    Jan. 31, 2008

Related U.S. Application Data

(60) Provisional application No. 60/820,521, filed on Jul. 27, 2006.

(51) Int. Cl.
  G06F 11/30      (2006.01)
  G21C 17/00      (2006.01)
(52) U.S. Cl. .................................................... 702/183
(58) Field of Classification Search .................. 702/183
  See application file for complete search history.

(56) References Cited

U.S. PATENT DOCUMENTS 5,067,099 A * 11/1991 McCown et al. ............ 702/183
6,915,237 B2 * 7/2005 Hashemian ................. 702/183
6,928,370 B2 * 8/2005 Anuzis et al. ................ 702/56
6,973,413 B2 * 12/2005 Hashemian ................. 702/183
7,254,520 B2 * 8/2007 Hashemian ................. 702/183
2003/0216879 A1 * 11/2003 Hashemian ................... 702/95
2005/0015624 A1 * 1/2005 Ginter et al. ................ 713/201
2005/0182969 A1 * 8/2005 Ginter et al. ................ 713/201
2007/0050777 A1 * 3/2007 Hutchinson et al. ......... 718/104
2008/0208429 A1 * 8/2008 Saravanapriyan et al. ... 701/100

* cited by examiner

Primary Examiner—Michael P. Nghiem
Assistant Examiner—Cindy H Khuu

(57) ABSTRACT

The present invention provides for monitoring the health of a system. In one embodiment, a method includes storing benchmark data in a memory, storing a second plurality of system data indicative of system conditions during system operations, determining from the second plurality of system data that the system was operating at a steady state capacity level during at least one sample window of the system operations, associating the steady state capacity level of the at least one sample window with the benchmark data, retrieving first health data for parameters associated with a first health condition from the first plurality of system data, retrieving second health data for parameters associated with the first health condition from the second plurality of system data that were obtained during the at least one sample window, comparing the health data and determining if the second health data is indicative of a health condition.

4 Claims, 13 Drawing Sheets

| Design Condition | Inch-Pound (I-P) | International (SI) |
|---|---|---|
| Condenser Waterside Temperature Drop (ΔT) | 95° - 85°F = 10°F | 35° - 29°C = 6°C |
| Condenser Waterside Pressure Drop (ΔP) | 30 psig - 20 psig = 10 psig | 206 kPa - 137 kPa = 69 kPa |
| Condenser Approach | 105° - 95°F = 10°F | 41° - 35°C = 6°C |
| Condensing Pressure | 11 psig | 76 kPa |
| Condensing Liquid Pressure | 105°F | 41°C |
| Evaporator Waterside Temperature Drop (ΔT) | 55° - 45°F = 10°F | 13° - 7°C = 6°C |
| Evaporator Waterside Pressure Drop (ΔP) | 40 psig - 30 psig = 10 psig | 276 kPa - 207 kPa = 69 kPa |
| Evaporator Approach | 45° - 35°F = 10°F | 7° - 2°C = 5°C |
| Evaporator Refrigerant Liquid Temperature | 35°F | 2°C |
| Evaporator Pressure | 17-inch Vacuum | 4 kPa |
| Compressor Discharge Temperature | 130°F | 54°C |

FIG. 1 (Prior Art)

|  | Description | Sensor Range | Sensor Accuracy |
|---|---|---|---|
| 176 | Chilled Water Supply Temperature | 20° to 70°F (-7° to 21°C) | ±0.6°F (±0.3°C) |
| 178 | Chilled Water Return Temperature | 20° to 70°F (-7° to 21°C) | ±0.6°F (±0.3°C) |
| 180 | Condenser Water Supply Temperature | 50° to 110°F (10° to 43.3°C) | ±0.6°F (±0.3°C) |
| 182 | Condenser Water Return Temperature | 50° to 110°F (10° to 43.3°C) | ±0.6°F (±0.3°C) |
| 184 | Chilled Water Flow | N/A | ±2.0% |
| 186 | Refrigerant Condensing Temperature | 80° to 110°F (26.6° to 43.3°C) | ±0.3°F (±0.2°C) |
| 188 | Refrigerant Condensing Pressure | 0 to 20 psig (0 to 137.4 kPa) | ±0.5 psig (±3.5 Pa) |
| 190 | Refrigerant Liquid Temperature | 10° to 60°F (-12.2° to 15.6°C) | ±0.3°F (±0.2°C) |
| 192 | Refrigerant Evaporating Pressure | 0 to 20" Vac (0 to -4.96 kPa) | ±0.5 psia (±3.5 Pa) |
| 194 | Amperage or kW Consumption | N/A | ±2.0% |
| 196 | Compressor Discharge Temperature | N/A | N/A |
| 198 | Chilled Water Differential Pressure | 0 to 50 psig (0 to 343.5 kPa) | ±2.0% |
| 200 | Condenser Water Differential Pressure | 0 to 50 psig (0 to 343.5 kPa) | ±2.0% |
| 202 | Oil Temperature | 30° to 250°F (-1° to 121°C) | ±1°F (±0.5°C) |
| 204 | Oil Pressure | 0 to 750" WG (0 to 200 kPa) | ±2.0% |
| 206 | Condenser Water Flow | N/A | ±2.0% |
| 208 | Outside Air Dry Bulb Temperature | -58° to 122°F (-50° to 50°C) | ±1.3°F (±0.7°C) |
| 210 | Outside Air Dew Point Temperature | -40° to 140°F (-40° to 60°C) | ±2°F (±1°C) |

FIG. 5

METHOD AND APPARATUS FOR EQUIPMENT HEALTH MONITORING

This application claims the benefit of provisional U.S. Patent Application No. 60/820,521, filed on Jul. 27, 2006. The disclosure of this provisional patent application is hereby totally incorporated by reference in its entirety.

FIELD OF THE INVENTION

The present invention relates generally to systems and equipment such as systems and equipment used in heating, ventilation, air conditioning, and other systems or machinery of a building or facility.

BACKGROUND OF THE INVENTION

Heating, ventilation and air-conditioning ("HVAC") systems are used in all types of commercial, industrial and residential facilities (hereinafter referred to as "buildings"). In general, the HVAC system is designed to maintain various predetermined set points, such as temperature. To that end, a system that generates hot air may be controlled on or off depending on the need for heat in a particular location. The supply of conditioned air (hot or cold) may further be controlled by the use of dampers within the air supply system. In larger buildings, the dampers may be actively controlled to regulate the supply of conditioned air.

HVAC systems thus include a wide assortment of components which interact with or influence other components. Accordingly, while various parameters on a particular device may be trending out of the normal operating range, the trend may be the result of a problem occurring in another component in the same or even a different system. Thus, while catastrophic failure of a component produces readily identifiable effects, a slowly developing problem is more difficult to identify.

Some efforts toward the early identification of potential problems include the monitoring of specific parameters. For example, much can be determined about a chiller's performance (and hence, required maintenance) by monitoring its water and refrigerant conditions and noting any deviation from design or established benchmark values. Basic chiller operating conditions include:

Condenser and evaporator pressure and corresponding temperature

Waterside temperature drop ($\Delta T$)

a Waterside pressure drop ($\Delta P$)

Heat exchanger approach temperature

Compressor discharge temperature

Purge unit run time

FIG. 1 illustrates design values, in I-P (SI) units, for an exemplary single stage R-123 centrifugal liquid chiller operating at full load conditions.

The foregoing parameters can be used to identify many problems to which chillers are vulnerable. Many basic chiller problems result in a decreased heat transfer between the refrigerant circuit and the water circuit. In the condenser, or high side, this results in an elevated refrigerant pressure, while in the evaporator, or low side, the result is a lower refrigerant pressure. Increased condensing pressure and/or decreased evaporating pressure results in increased power consumption by the compressor motor and decreased system efficiency.

High head pressure (condenser pressure) is a standard safety cutout found on most chillers. Frequent chiller trips (i.e., when the chiller safety cutout is triggered, or "tripped") can occur if the entering condenser water temperature habitually gets too high. Chiller trips due to hindered heat transfer within the condenser usually occur at less frequent intervals. An example of this is when the condenser water tubes gradually become fouled.

On the low side, if the compressor inlet guide vanes are inoperative or out of adjustment, the compressor may not match the evaporator load, causing elevated or lowered evaporator pressure and temperature.

The pressure in the evaporator or condenser, which in the exemplary single stage R-123 centrifugal liquid chiller are shell and tube heat exchangers, corresponds to a given temperature. At this temperature and pressure, the refrigerant, in a vapor/liquid state, is changing state as it releases heat to or absorbs heat from the circulating water. These temperature/pressure relationships are generally provided on the manufacturer's refrigerant chart for the particular refrigerant. The operating temperature/pressure may be useful in determining the health of the chiller.

While constant monitoring of a system is beneficial, particularly for rapidly escalating situations which have not yet pushed a parameter out of its normal range, merely monitoring the operating conditions do not provide the desired insight into more slowly developing problems. The identification of slowly developing problems is further complicated by the fact that the loading of equipment varies over time. For example, the temperature on a given day may be cool in the early hours of the day. Thus, systems used for cooling may not be operating at all. As the day progresses, however, the outside temperature may rise, driving temperatures in the building upwardly. In response, the cooling system initiates or works harder to maintain the water provided to the various terminals located throughout the building at a constant temperature.

Accordingly, the load on a cooling system may vary from zero to one hundred percent loading. As the load on the system changes, of course, the various operating parameters of the system will vary. This normal variance can mask developing problems.

In order to correct slowly developing problems before a component failure, it is common for many types of systems and/or equipment to be subjected to maintenance, calibrations and/or alignments at regular intervals. These preventative measures are very effective at early detection and subsequent avoidance of component or system failures. Of course, the procedures may be quite expensive. Moreover, depending upon the nature of the particular system, the capacity of the system may be curtailed or even eliminated during the foregoing activities. These considerations weigh toward a long period of time between the various preventative measures. As the time between the various activities increases, however, the chance of an undesired catastrophic failure also increases.

As a consequence, there is a need for apparatus and method that can reduce at least some of the drawbacks and costs identified above. For example, there is a need for a method and/or apparatus that reduces the costs associated with the determination of the health of a device. There is a further need for a method and/or apparatus that can be used to ascertain the health of a device or system that does not place undue constraints on the use of the equipment or system. There is yet a further need for a method and/or apparatus that provides insight into the health of the equipment or system which is not unduly affected by the normal variations in the operating parameters of the equipment or system.

SUMMARY OF THE INVENTION

The present invention provides for monitoring the health of a system. In one embodiment, a method of monitoring the health of a system includes storing a first plurality of system data associated with at least one steady state capacity level in a memory, obtaining a second plurality of system data indicative of system conditions during system operations, identifying from the second plurality of system data that the system was operating at a steady state capacity level during at least one sample window of the system operations, associating the steady state capacity level of the at least one sample window with the at least one steady state capacity level, retrieving first health data for parameters associated with a first health condition from the first plurality of system data, retrieving second health data for parameters associated with the first health condition from the second plurality of system data that were obtained during the at least one sample window, comparing the first health data with the second health data, determining if the second health data is indicative of a health condition based upon the comparison and displaying the results of the determination.

In a further embodiment, a method in accordance with aspects of the invention includes identifying a plurality of parameters associated with a first condition of a device, establishing a plurality of first steady state operating conditions for the device, each of the plurality of steady state operating conditions at a capacity level of the device different from the capacity level of each of the other of the plurality of steady state operating conditions, obtaining first data corresponding to the plurality of parameters during each of the plurality of first steady state operating conditions, storing the first data, obtaining second data corresponding to the plurality of parameters during at least one sample window during a steady state condition during normal operations of the device, identifying the system capacity level during the at least one sample window, associating the at least one sample window with one of the plurality of first steady state operating conditions based upon the identification, comparing, for each of the plurality of parameters, the second data from the at least one sample window with the first data obtained during the associated one of the plurality of first steady state operating conditions, determining the health of the device based upon the comparison and displaying the results of the determination.

In another embodiment, a system for monitoring the health of a system includes a plurality of sensors for obtaining a plurality of data associated with at least one health condition of the system, a memory for storing the plurality of data and for storing commands in the memory to store, for each of a plurality of system capacity levels, first steady state data for a plurality of parameters associated with the at least one health condition of the system, obtain normal operations data corresponding to the plurality of parameters during a plurality of sample windows during steady state conditions of the system, associate the normal operations data with the first steady state data based upon a sample window system capacity level for each of the plurality of sample windows, compare, for each of the plurality of parameters, the normal operations data with the associated first steady state data, and display the results of the comparison and a processor for executing the commands.

The above described features and advantages, as well as others, will become more readily apparent to those of ordinary skill in the art by reference to the following detailed description and accompanying drawings.

BRIEF DESCRIPTION OF THE DRAWINGS

FIG. 1 shows prior art design conditions for a single stage CFC-11 centrifugal chiller at full load;

FIG. 5 shows a table of sensors which may be used in the chilled water system of FIG. 4 along with exemplary sensor ranges and accuracies;

DETAILED DESCRIPTION

Figure 2:
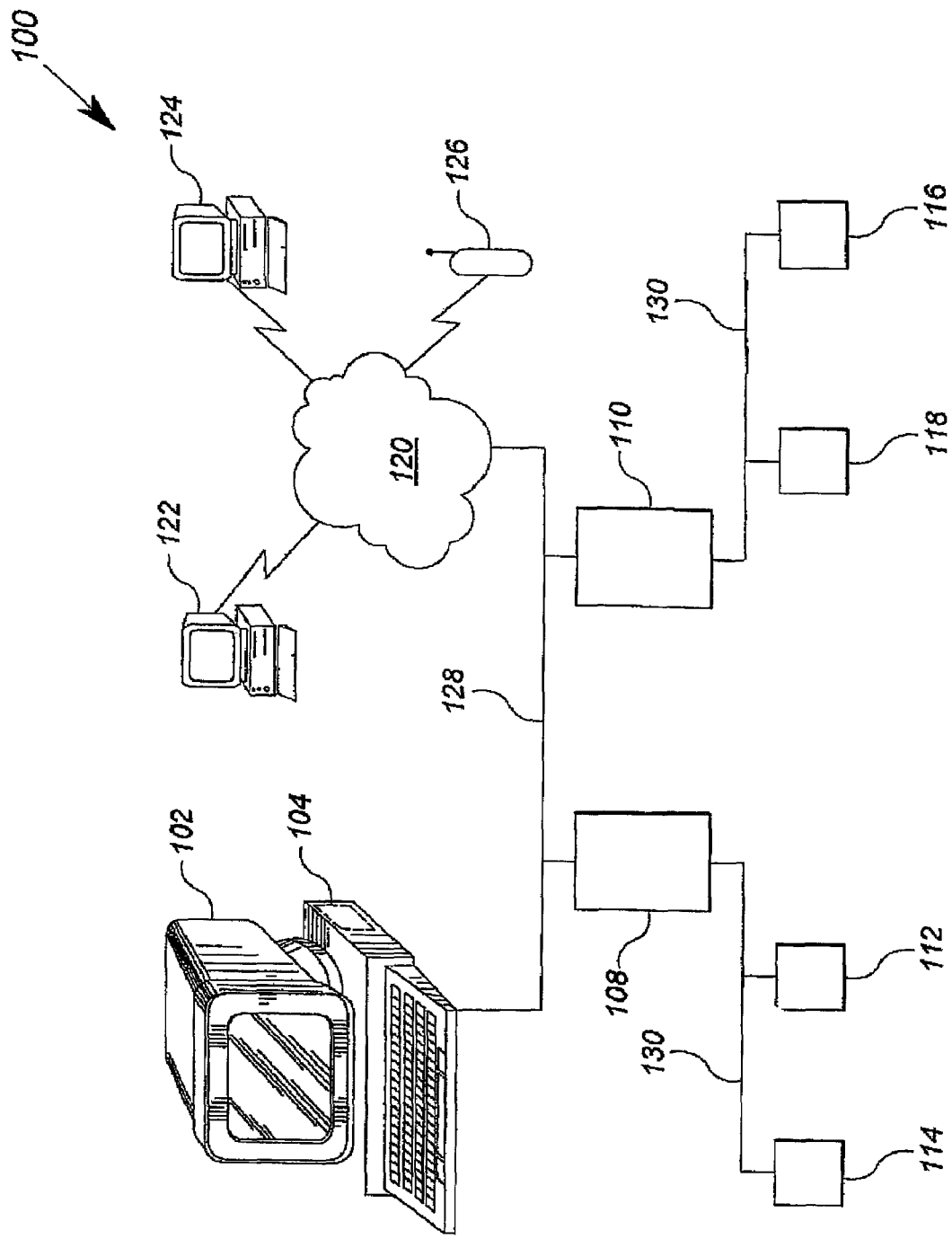
FIG. 2 shows a block diagram of a building control system in which the system and the method of the present invention may be used.

FIG. 2 shows an exemplary representative block diagram of a building control system 100 that includes a supervisory control system 102, a system database 104, programmable controllers 108 and 110, and a plurality of configurable controllers 112, 114, 116 and 118. Building control system 100 in this; embodiment is accessible via a network 120 that permits access by a remote browser 122, a laptop computer 124 and/or a wireless device 126.

The programmable controllers 108 and 110, which may suitably be an APOGEE® mechanical equipment controller commercially available from Siemens Building Technologies, Inc. of Buffalo Grove, Ill., are operably connected to the supervisory computer 102 through a control system network 128. The control system network 128 may be any communications protocol including Ethernet, TCP/IP, BACnet, or a proprietary protocol. The programmable controllers 108 and 110 are connected to monitoring and control devices which in this embodiment include the configurable controllers 112, 114, 116, and 118, through a low-level data network 130 to provide integrated control, supervision and network management services to the configurable controllers 112, 114, 116, and 118.

The supervisory computer 102 in this embodiment includes an INSIGHT® workstation commercially available from Siemens. The supervisory computer 102 may be used for database management, alarm management, and messaging service. The supervisory computer 102 is also used to set up and manage the components in the building control system 100.

Each of the configurable controllers 112, 114, 116 and 118 may be configured to provide direct digital control of a variety of mechanical equipment ranging from zone level control of variable air volume (VAV)/constant volume (CV), heat pumps, unit ventilators and fan coil units to air distribution units and mechanical units including spare point pick up of miscellaneous zone equipment.

Figure 3:
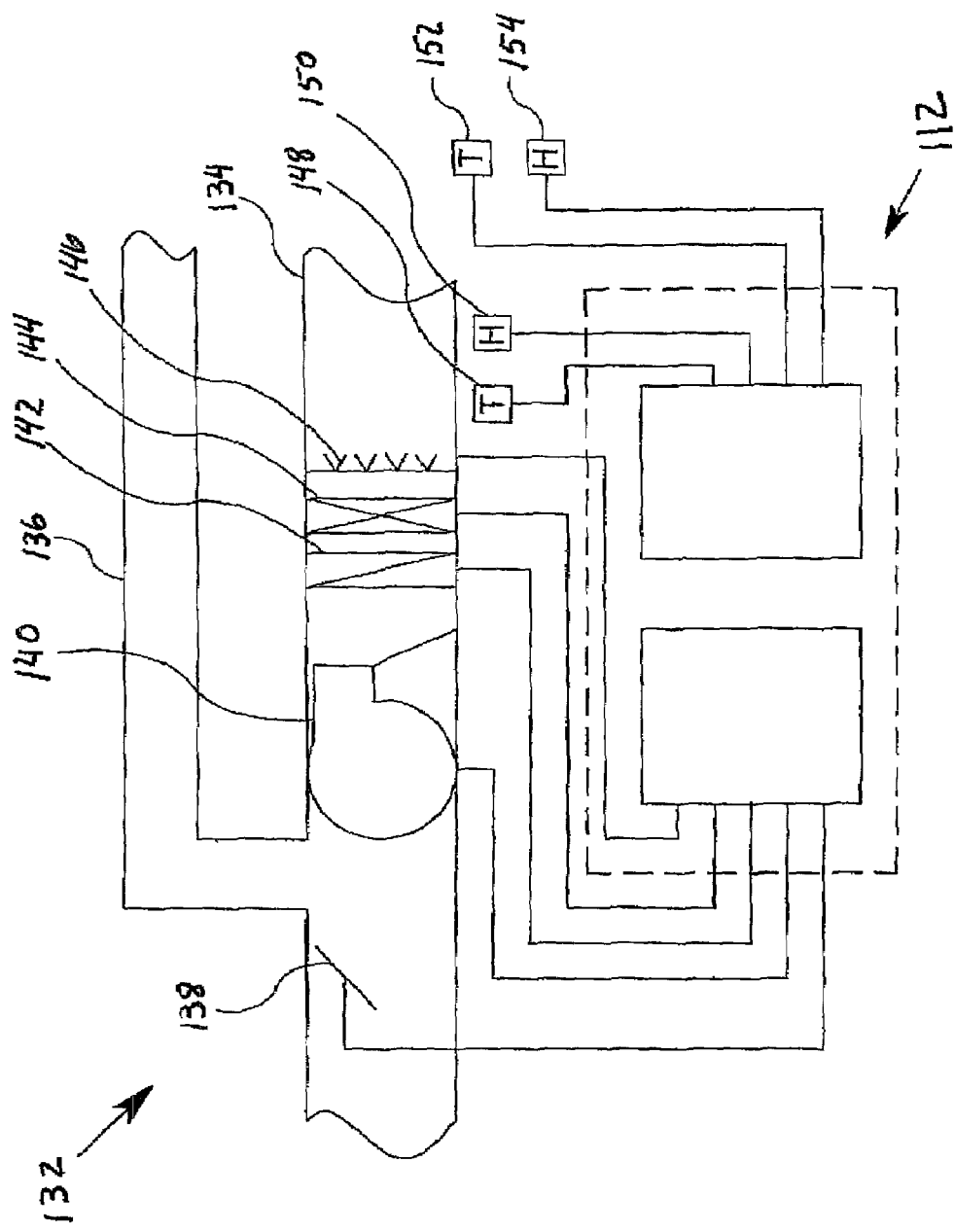
FIG. 3 shows a schematic diagram of a single zone air handler with a humidifier.
Figure 4:
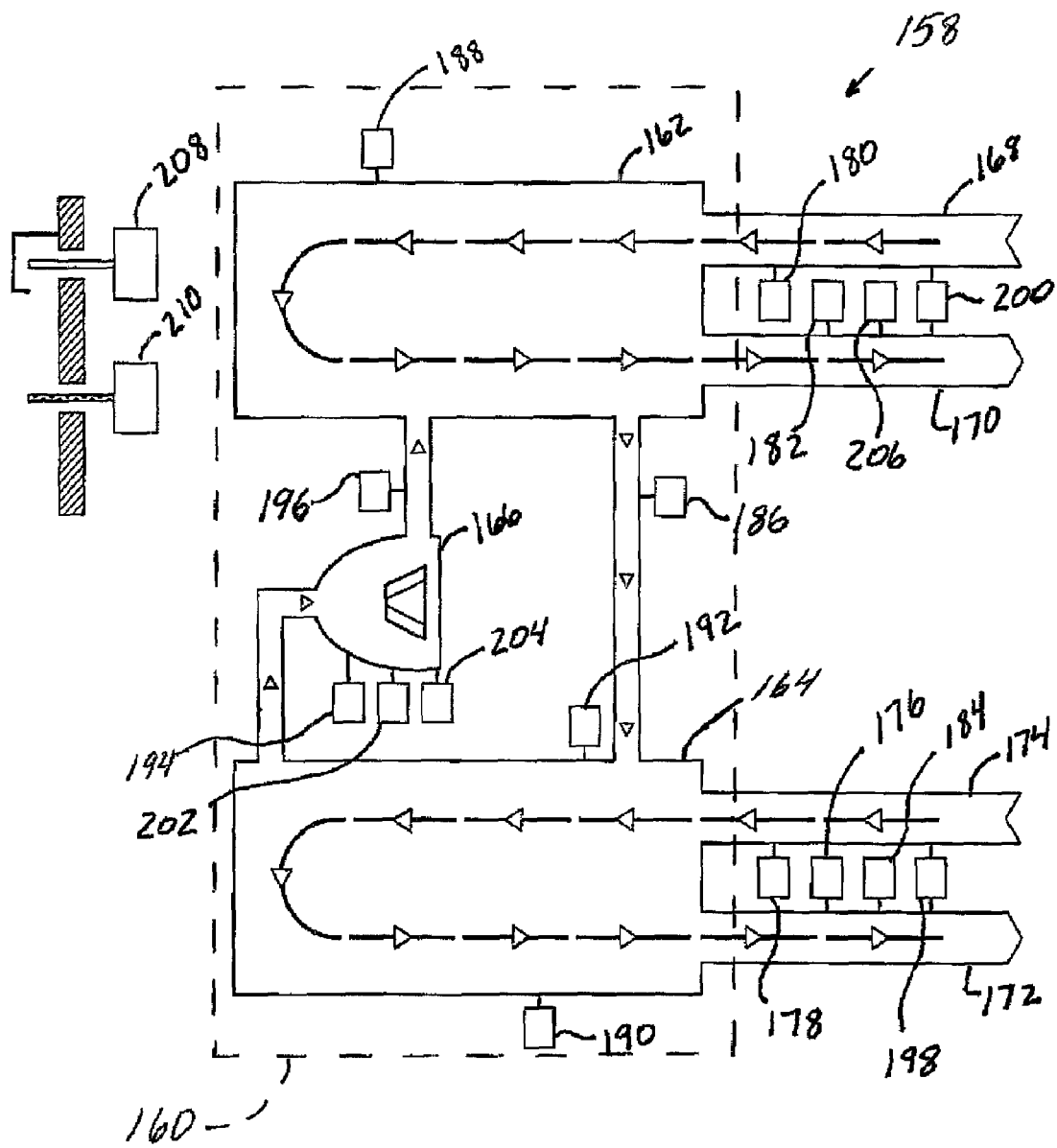
FIG. 4 shows a schematic diagram of a chilled water system used to provide chilled water to the single zone air handler of FIG. 3 which is controlled by a controller of FIG. 2.

In an exemplary configuration shown in FIG. 3, the configurable controller 112 is configured to control a single zone air handler with a humidifier. The single zone system 132 includes the configurable controller 112, an air supply header 134, a return header 136, an outside air (OA) damper 138, a fan 140, a heater 142, a cooler 144 and a humidifier 146. The single zone system 132 also includes a variety of sensors including a supply header temperature sensor 148, a supply header humidity sensor 150, a zone temperature sensor 152 and a zone humidity sensor 154.

The cooler 144 is supplied with chilled water from a chilled water system 158. The chilled water system 158 includes chiller 160 with a condenser 162, an evaporator 164 and a compressor 166. The condenser 162 and the evaporator 164 are shell and tube type heat exchangers. Condenser water is supplied to the condenser 162 through a condenser feed header 168 and returned through a condenser water return header 170. Chilled water is supplied to the cooler 144 and other systems by a chilled water supply header 172 and returned to the evaporator 164 through a chilled water return header 174.

The operation of the chilled water system 158 is controlled by the configurable controller 114. To provide the desired control, a variety of sensors are provided in the chilled water system 158. Communications between the various sensors and the controller 114 may be effected in any acceptable mariner such as by providing a wireless network or by wiring the sensors to the controller 114.

The sensors in this embodiment include a chilled water supply temperature sensor 176, chilled water return temperature sensor 178, condenser water supply temperature sensor 180, condenser water return temperature sensor 182, chilled water flow sensor 184, refrigerant condensing temperature sensor 186, refrigerant condensing pressure sensor 188, refrigerant liquid temperature sensor 190, refrigerant evaporating pressure sensor 192, amperage or kW consumption sensor 194, compressor discharge temperature sensor 196, chilled water differential pressure sensor 198, condenser water differential pressure sensor 200, oil temperature sensor 202, oil pressure sensor 204, condenser water flow sensor 206, outside air dry bulb temperature sensor 208, outside air dew point temperature sensor 210 and a purge unit run time sensor (not shown). Exemplary sensor ranges and accuracies for the foregoing sensors are provided in FIG. 5.

Figure 6:
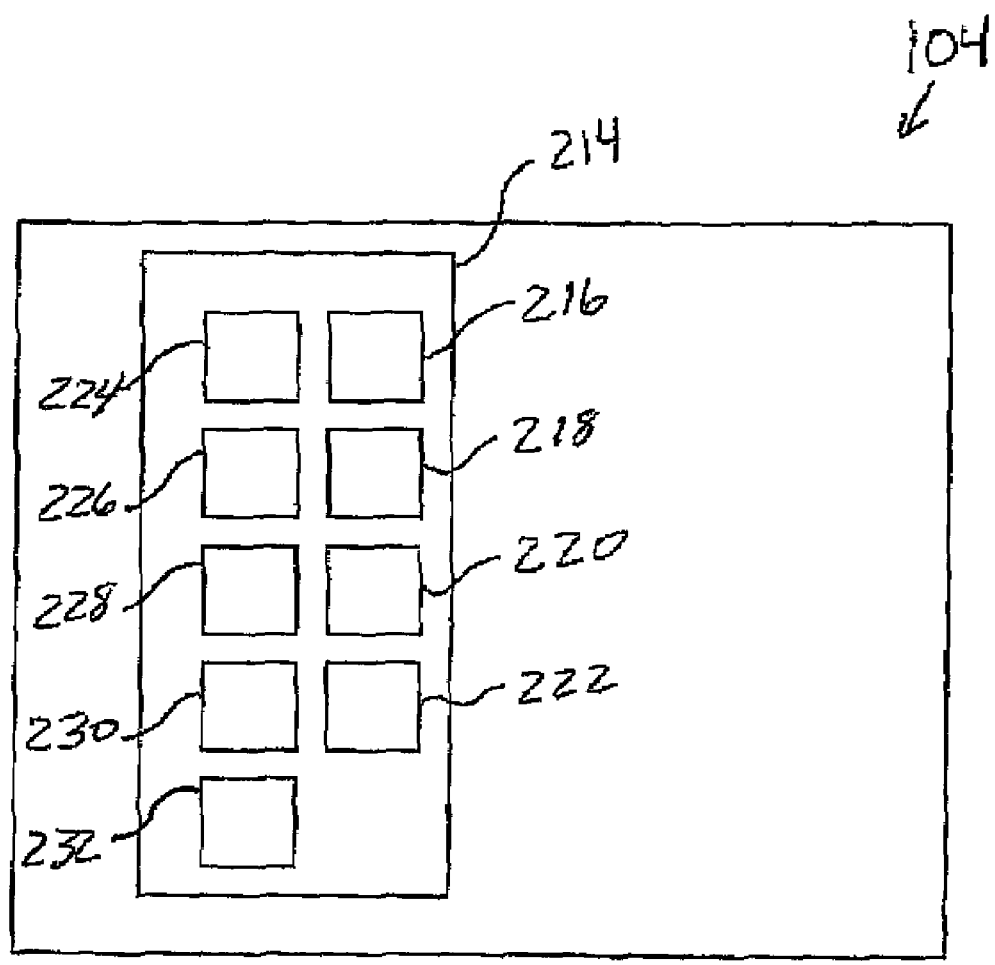
FIG. 6 shows a schematic diagram of the database of FIG. 2 including a health monitoring program with various sub modules for use in identifying data which indicates the percentage of samples which indicate that a condition is present in the chilled water system of FIG. 4.

The sensors associated with the chilled water system 158 are typically used to monitor the chilled water system 158 during operations so as to identify any components that are not operating properly. The data available from the sensors associated with the chilled water system 158 are further used by a health monitoring program 214 which in this embodiment is stored within the system database 104. As depicted in FIG. 6, the health monitoring program 214 includes sub modules 216, 218, 220, 222, 224, 226, 228, 230 and 232.

The health monitoring program 214 includes instructions which are common to the sub modules. In one embodiment, the health monitoring program includes the following commands:

```
00100 C
00200 C      DEFINING CHILLER NAMING CONVENSION
00300 DEFINE (X, "CHILLER-1")
00400 C      DEFINING DEM NAMING CONVENSION
```

-continued

```
00500 DEFINE (Y, "CHL01.DEM1")
00600 C      DETERMINING IF THE CHILLER IS RUNNING
00700 IF("%X%:OPER CODE" .GE. 8.0 .AND.
"%X%:OPER CODE" .LE. 9.0)
THEN ON("%X%
00800 C      WAIT FOR STARTED CHILLER TO SETTLE OUT
00900 IF("%X%.STATUS" .NE. ON) THEN OFF("%X%.STARTED")
01000 WAIT(180,"%X%.STATUS","%X%.STARTED",11)
01100 C      CALCULATE COMPRESSOR MOTOR CURRENT
01200 "%X%.CURRENT" = "%Y%:CURRENT"
01300 C      CALCULATE COMPRESSOR DISCHARGE
TEMPERATURE
01400 "%X%.CDT" = "%X%:COMPDISCH T"
01500 C      CALCULATE PURGE PRESSURE
01600 "%X%.PURGE" = "%X%:PURGE PRESS"
01700 C      CALCULATE CONDENSER WATER DELTA
TEMPERATURE
01800 "%X%.CWDT" = "%X%:LCNDW TEMP" – "%X%:RCNDW TEMP"
01900 C      CALCULATE CONDENSER WATER DELTA
PRESSURE
02000 "%X%.CWDP" = "%X%.CWDP"
02100 C      CALCULATE CONDENSER APPROACH
02200 "%X%.CDAP" = "%X%:CONDSAT TEMP" – "%X%:LCNDW TEMP"
02300 C      CALCULATE CONDENSER REFRIGERANT PRESSURE
02400 "%X%.CDRP" = "%X%:COND PRESS"
02500 C CALCULATE CONDENSER REFRIGERANT SATURATION
TEMP
02600 "%X%.CDRST" = "%X%:CONDSAT TEMP"
02700 C   DESIGN COND. WATER DELTA TEMP 5%
TOLERANCES @ 30% LOA
02800 "%X%.D30.CWDT.HI" = "%X%.D30.CWDT" * 1.05
02900 "%X%.D30.CWDT.LO" = "%X%.D30.CWDT" * 0.95
03000 C DESIGN COND WATER DELTA TEMP 5%
TOLERANCES @ 40% LOA
03100 "%X%.D40.CWDT.HI" = "%X%.D40.CWDT" * 1.05
03200 "%X%.D40.CWDT.LO" = "%X%.D40.CWDT" * 0.95
03300 C   DESIGN COND WATER DELTA TEMP 5%
TOLERANCES @ 50% LOA
03400 "%X%.D50.CWDT.HI" = "%X%.D50.CWDT" * 1.05
03500 "%X%.D50.CWDT.LO" = "%X%.D50.CWDT" * 0.95
03600 C   DESIGN COND WATER DELTA TEMP 5%
TOLERANCES @ 60% LOA
03700 "%X%.D60.CWDT.HI" = "%X%.D60.CWDT" * 1.05
03800 "%X%.D60.CWDT.LO" = "%X%.D60.CWDT" * 0.95
03900 C   DESIGN COND WATER DELTA TEMP 5%
TOLERANCES @ 70% LOA
04000 "%X%.D70.CWDT.HI" = "%X%.D70.CWDT" * 1.05
04100 "%X%.D70.CWDT.LO" = "%X%.D70.CWDT" * 0.95
04200 C   DESIGN COND WATER DELTA TEMP 5%
TOLERANCES @ 80% LOA
04300 "%X%.D80.CWDT.HI" = "%X%.D80.CWDT" * 1.05
04400 "%X%.D80.CWDT.LO" = "%X%.D80.CWDT" * 0.95
04500 C DESIGN COND WATER DELTA TEMP 5%
TOLERANCES @ 90% LOA
04600 "%X%.D90.CWDT.HI" = "%X%.D90.CWDT" * 1.05
04700 "%X%.D90.CWDT.LO" = "%X%.D90.CWDT" * 0.95
04800 C DESIGN COND WATER DELTA TEMP 5%
TOLERANCES @ 100% LO
04900 "%X%.D100.CWDT.HI" = "%X%.D100.CWDT" * 1.05
05000 "%X%.D100.CWDT.LO" = "%X%.D100.CWDT" * 0.95
05100 C   DESIGN COND WATER DELTA PRES 5%
TOLERANCES @ 30% LOAD
05200 "%X%.D30.CWDP.HI" = "%X%.D30.CWDP" * 1.05
05300 "%X%.D30.CWDP.LO" = "%X%.D30.CWDP" * 0.95
05400 C DESIGN COND WATER DELTA PRES 5%
TOLERANCES @ 40% LOAD
05500 "%X%.D40.CWDP.HI" = "%X%.D40.CWDP" * 1.05
05600 "%X%.D40.CWDP.LO" = "%X%.D40.CWDP" * 0.95
05700 C DESIGN COND WATER DELTA PRES 5%
TOLERANCES @ 50% LOAD
05800 "%X%.D50.CWDP.HI" = "%X%.D50.CWDP" * 1.05
05900 "%X%.D50.CWDP.LO" = "%X%.D50.CWDP" * 0.95
06000 C DESIGN COND WATER DELTA PRES 5%
TOLERANCES @ 60% LOAD
6100 "%X%.D60.CWDP.HI" = "%X%.D60.CWDP" * 1.05
06200 "%X%.D60.CWDP.LO" = "%X%.D60.CWDP" * 0.95
06300 C DESIGN COND WATER DELTA PRES 5%
```

-continued
```
TOLERANCES @ 70% LOAD
06400 "%X%.D70.CWDP.HI" = "%X%.D70.CWDP" * 1.05
06500 "%X%.D70.CWDP.LO" = "%X%.D70.CWDP" * 0.95
06600 C DESIGN COND WATER DELTA PRES 5%
TOLERANCES @ 80% LOAD
06700 "%X%.D80.CWDP.HI" = "%X%.D80.CWDP" * 1.05
06800 "%X%.D80.CWDP.LO" = "%X%.D80.CWDP" * 0.95
06900 C DESIGN COND WATER DELTA PRES 5%
TOLERANCES @ 90% LOAD
07000 "%X%.D90.CWDP.HI" = "%X%.D90.CWDP" * 1.05
07100 "%X%.D90.CWDP.LO" = "%X%.D90.CWDP" * 0.95
07200 C DESIGN COND WATER DELTA PRES5%
TOLERANCES @ 100% LOAD
07300 "%X%.D100.CWDP.HI" = "%X%.D100.CWDP" * 1.05
07400 "%X%.D100.CWDP.LO" = "%X%.D100.CWDP" * 0.95
07500 C DESIGN COND APPROACH 5% TOLERANCES @ 30%
LOAD
07600 "%X%.D30.CDAP.HI" = "%X%.D30.CDAP" * 1.05
07700 "%X%.D30.CDAP.LO" = "%X%.D30.CDAP" * 0.95
07800 C     DESIGN CONDENSER APPROACH 5%
TOLERANCES @ 40% LOAD
07900 "%X%.D40.CDAP.HI" = "%X%.D40.CDAP" * 1.05
08000 "%X%.D40.CDAP.LO" = "%X%.D40.CDAP" * 0.95
08100 C     DESIGN CONDENSER APPROACH 5%
TOLERANCES @ 50% LOAD
08200 "%X%.D50.CDAP.HI" = "%X%.D50.CDAP" * 1.05
08300 "%X%.D50.CDAP.LO" = "%X%.D50.CDAP" * 0.95
08400 C     DESIGN CONDENSER APPROACH 5%
TOLERANCES @ 60% LOAD
08500 "%X%.D60.CDAP.HI" = "%X%.D60.CDAP" * 1.05
08600 "%X%.D60.CDAP.LO" = "%X%.D60.CDAP" * 0.95
08700 C     DESIGN CONDENSER APPROACH 5%
TOLERANCES @ 70% LOAD
08800 "%X%.D70.CDAP.HI" = "%X%.D70.CDAP" * 1.05
08900 "%X%.D70.CDAP.LO" = "%X%.D70.CDAP" * 0.95
09000 C     DESIGN CONDENSER APPROACH 5%
TOLERANCES @ 80% LOAD
09100 "%X%.D80.CDAP.HI" = "%X%.D80.CDAP" * 1.05
09200 "%X%.D80.CDAP.LO" = "%X%.D80.CDAP" * 0.95
09300 C     DESIGN CONDENSER APPROACH 5%
TOLERANCES @ 90% LOAD
09400 "%X%.D90.CDAP.HI" = "%X%.D90.CDAP" * 1.05
09500 "%X%.D90.CDAP.LO" = "%X%.D90.CDAP" * 0.95
09600 C  DESIGN CONDENSER APPROACH 5%
TOLERANCES @ 100% LOAD
09700 "%X%.D100.CDAP.HI" = "%X%.D100.CDAP" * 1.05
09800 "%X%.D100.CDAP.LO" = "%X%.D100.CDAP" * 0.95
09900 C     CALCULATE CHILLED WATER DELTA
TEMPERATURE
10000 "%X%.CHWDT" =
"%X%:RCHW TEMP" - "%X%:LCHW TEMP"
10100 C     CALCULATE CHILLED WATER DELTA PRESSURE
10200 "%X%.CHWDP" = "%X%.CHWDP"
10300 C     CALCULATE EVAPORATOR APPROACH
10400 "%X%.EVAP" =
"%X%:LCHW TEMP" - "%X%:EVAPSAT TEMP"
10500 C     CALCULATE EVAPORATOR REFRIGERANT
PRESSURE
10600 "%X%.EVRP" = "%X%:EVAP PRESS"
10700 C CALC EVAPORATOR REFRIGERANT SATURATION
TEMPERATURE
10800 "%X%.EVRST" = "%X%:EVAPSAT TEMP"
10900 C DESIGN CHILL WATER DELTA PRES 5%
TOLERANCES @ 30% LOAD
11000 "%X%.D30.CHWDP.HI" = "%X%.D30.CHWDP" * 1.05
11100 "%X%.D30.CHWDP.LO" = "%X%.D30.CHWDP" * 0.95
11200 C DESIGN CHILL WATER DELTA PRES 5%
TOLERANCES @ 40% LOAD
11300 "%X%.D40.CHWDP.HI" = "%X%.D40.CHWDP" * 1.05
11400 "%X%.D40.CHWDP.LO" = "%X%.D40.CHWDP" * 0.95
11500 C DESIGN CHILL WATER DELTA PRES 5%
TOLERANCES @ 50% LOAD
11600 "%X%.D50.CHWDP.HI" = "%X%.D50.CHWDP" * 1.05
11700 "%X%.D50.CHWDP.LO" = "%X%.D50.CHWDP" * 0.95
11800 C DESIGN CHILL WATER DELTA PRES 5%
TOLERANCES @ 60% LOAD
11900 "%X%.D60.CHWDP.HI" = "%X%.D60.CHWDP" * 1.05
12000 "%X%.D60.CHWDP.LO" = "%X%.D60.CHWDP" * 0.95
12100 C DESIGN CHILL WATER DELTA PRES 5%
```

-continued
```
TOLERANCES @ 70% LOAD
12200 "%X%.D70.CHWDP.HI" = "%X%.D70.CHWDP" * 1.05
12300 "%X%.D70.CHWDP.LO" = "%X%.D70.CHWDP" * 0.95
12400 C DESIGN CHILL WATER DELTA PRES 5%
TOLERANCES @ 80% LOAD
12500 "%X%.D80.CHWDP.HI" = "%X%.D80.CHWDP" * 1.05
12600 "%X%.D80.CHWDP.LO" = "%X%.D80.CHWDP" * 0.95
12700 C DESIGN CHILL WATER DELTA PRES 5%
TOLERANCES @ 90% LOAD
12800 "%X%.D90.CHWDP.HI" = "%X%.D90.CHWDP" * 1.05
12900 "%X%.D90.CHWDP.LO" = "%X%.D90.CHWDP" * 0.95
13000 C DESIGN CHILL WATER DELTA PRES 5%
TOLERANCES @ 100% LOAD
13100 "%X%.D100.CHWDP.HI" = "%X%.D100.CHWDP" * 1.05
13200 "%X%.D100.CHWDP.LO" = "%X%.D100.CHWDP" * 0.95
13300 C     CALCULATE TEMPERATURE ADJUSTED MAXIMUM
CAPACITY
13400 "%X%.CAPFT" = -(1.74204) +
0.029292 * "%X%:LCHW TEMP" - 0.000067 * "%X%:
13500 "%X%.ADJCAP" = "%X%.MAXCAP" * "%X%.CAPFT"
13600 C     CALCULATE CURRENT LOAD
13700 "%X%.CURLOAD" =
"%X%.CHWFLOW" * "%X%.CHWDT" / 24
13800 C     CALCULATE PART LOAD
13900 "%X%.PLOAD" = "%X%.CURLOAD" / "%X%.ADJCAP" * 100
14000 C     CALCULATE CHILLER EFFICIENCY (KW/TON)
14100 "%X%.EFF" = "%Y%:DEMAND" / "%X%.CURLOAD"
14200 C     CALCULATE CHILLER COEFFICIENT OF
PERFORMANCE
14300 "%X%.COP" = 3.516 / "%X%.EFF"
14400 GOTO 100
```

Each of the sub modules 216, 218, 220, 222, 224, 226, 228, 230 and 232 include instructions for assessing the health of the chilled water system 158 with respect to a particular condition. This is accomplished by analysis of various groups of parameters which are affected by the particular condition.

Specifically, the sub module 216 is configured to provide data which may be used to determine if chilled water is bypassing the chilled water tubes within the condenser 162. This condition can occur when a leak develops between the chilled water return header 174 and the chilled water supply header 172. More precisely, a division plate (not shown) is used to separate the chilled water return header 174 and the chilled water supply header 172 within the shell of the condenser 162. Thus, a leak in the division plate (not shown) will allow water to bypass the water tubes in a heat exchanger and mix with the chilled water that has been cooled by the condenser 162.

More common is for a division plate gasket to be ruptured or missing. In the event such a condition develops, then, for a given partial load level, the chill water differential temperature, the chill water differential pressure, the evaporator refrigerant pressure and the evaporator refrigerant saturation temperature will be less than the design values for the particular partial load. Additionally, the evaporator approach will be higher than the design value for the particular partial load.

In one embodiment, the sub module 216 includes the following commands:

```
00100 C     DEFINE CHILLER NAMING CONVENSION
00200 DEFINE (X, "MHS.CHL1")
00300 C     DEFINES THE % LOAD DESIGN CRITERIA VALUE
COMPARISON
00400 IF("%X%.PLOAD" .GT. 25.0 .AND. "%X%.PLOAD" .LE. 35.0)
THEN GOSUB 1400 "%
00500 IF("%X%.PLOAD" .GT. 35.0 .AND. "%X%.PLOAD" .LE. 45.0)
THEN GOSUB 1400 "%
00600 IF("%X%.PLOAD" .GT. 45.0 .AND. "%X%.PLOAD" .LE. 55.0)
```

-continued

```
THEN GOSUB 1400 "%
00700 IF("%X%.PLOAD" .GT. 55.0 .AND. "%X%.PLOAD" .LE. 65.0)
   THEN GOSUB 1400 "%
00800 IF("%X%.PLOAD" .GT. 65.0 .AND. "%X%.PLOAD" .LE. 75.0)
   THEN GOSUB 1400 "%
00900 IF("%X%.PLOAD" .GT. 75.0 .AND. "%X%.PLOAD" .LE. 85.0)
   THEN GOSUB 1400 "%
01000 IF("%X%.PLOAD" .GT. 85.0 .AND. "%X%.PLOAD" .LE. 95.0)
   THEN GOSUB 1400 "%
01100 IF("%X%.PLOAD" .GT. 95.0) THEN GOSUB 1400
   "%X%.D100.CHWDT","%X%.D100.CHW
01200 GOTO 3200
01300 C SUBROUTINE FOR CONDITIONS WHICH POINT TO
   HAVING WATER BYPASSING
01400 $LOC1 = 0
01500 IF("%X%.CHWDT" .LT. $ARG1) THEN $LOC1 = $LOC1 + 1
01600 IF("%X%.CHWDP" .LT. $ARG2) THEN $LOC1 = $LOC1 + 1
01700 IF("%X%.EVAP" .GT. $ARG3) THEN $LOC1 = $LOC1 + 1
01800 IF("%X%.EVRP" .LT. $ARG4) THEN $LOC1 = $LOC1 + 1
01900 IF("%X%.EVRST" .LT. $ARG5) THEN $LOC1 = $LOC1 + 1
02000 C    DETERMINES THE NUMBER OF FLAGS
02100 IF("%X%.STARTED" .EQ. OFF .OR. $LOC1 .NE. 5) THEN
   GOTO 2400
02200 IF($LOC1 .EQ. 5 .AND. SECNDS .LE. 300) THEN GOTO 2600
02300 "%X%.EVAP.TUBE.BYPASS.FLAGS" =
   "%X%.EVAP.TUBE.BYPASS.FLAGS" + 1
02400 SECNDS = 0
02500 C    DETERMINES TOTAL NUMBER OF SAMPLES
02600 IF("%X%.STARTED" .EQ. OFF) THEN GOTO 2900
02700 IF("%X%.STARTED" .EQ. ON .AND. SECND1 .LE. 300) THEN
   GOTO 3000
02800 "%X%.EVAP.TUBE.BYPASS.SAMPLES" =
   "%X%.EVAP.TUBE.BYPASS.SAMPLES" + 1
02900 SECND1 = 0
03000 RETURN
03100 C    CALCULATES THE DAILY PERCENTAGE OF DATA
   WHICH MET THE CRITERIA
03200 IF(TIME .NE. 23:59) THEN GOTO 3700
03300 IF("%X%.EVAP.TUBE.BYPASS.SAMPLES" .NE. 0) THEN
   GOTO 3600
03400 "%X%.EVAP.TUBE.BYPASS" = 0
03500 GOTO 3700
03600 "%X%.EVAP.TUBE.BYPASS" =
   "%X%.EVAP.TUBE.BYPASS.FLAGS" /"%X%.EVAP.TUBE.B
03700 IF(TIME .NE. 00:00) THEN GOTO 4200
03800 SECNDS = 0
03900 SECND1 = 0
04000 "%X%.EVAP.TUBE.BYPASS.FLAGS" = 0
04100 "%X%.EVAP.TUBE.BYPASS.SAMPLES" = 0
04200 C    END OF PROGRAM
04300 GOTO 100
```

The sub module 218 is configured to provide data which may be used to determine if condenser water is bypassing the condenser water tubes within the evaporator 164. This condition can occur when a leak develops between the condenser feed header 168 and the condenser water return header 170 in a manner similar to the leak discussed above between the chilled water return header 174 and the chilled water supply header 172 within the shell of the condenser 162.

In the event such a condition develops, then, for a given partial load level, the condenser water differential temperature and the condenser water differential pressure will be lower than the design values for the particular partial load. Additionally, the condenser approach, the condenser refrigerant pressure, and the condenser refrigerant saturation temperature will be higher than the design values for the particular partial load.

In one embodiment, the sub module 218 includes the following commands:

```
00100 C    DEFINE CHILLER NAMING CONVENSION
00200 DEFINE (X, "MHS.CHL1")
00300 C    DEFINES THE % LOAD DESIGN CRITERIA VALUE
   COMPARISON
00400 IF("%X%.PLOAD" .GT. 25.0 .AND. "%X%.PLOAD" .LE. 35.0)
   THEN GOSUB    1400 "%
00500 IF("%X%.PLOAD" .GT. 35.0 .AND. "%X%.PLOAD" .LE. 45.0)
   THEN GOSUB    1400 "%
00600 IF("%X%.PLOAD" .GT. 45.0 .AND. "%X%.PLOAD" .LE. 55.0)
   THEN GOSUB    1400 "%
00700 IF("%X%.PLOAD" .GT. 55.0 .AND. "%X%.PLOAD" .LE. 65.0)
   THEN GOSUB    1400 "%
00800 IF("%X%.PLOAD" .GT. 65.0 .AND. "%X%.PLOAD" .LE. 75.0)
   THEN GOSUB    1400 "%
00900 IF("%X%.PLOAD" .GT. 75.0 .AND. "%X%.PLOAD" .LE. 85.0)
   THEN GOSUB    1400 "%
01000 IF("%X%.PLOAD" .GT. 85.0 .AND. "%X%.PLOAD" .LE. 95.0)
   THEN GOSUB    1400 "%
01100 IF("%X%.PLOAD" .GT. 95.0) THEN GOSUB 1400
   "%X%.D100.CWDT","%X%.D100.CWDP
01200 GOTO 3200
01300 C    SUBROUTINE FOR CONDITIONS WHICH POINT TO
   HAVING WATER BYPASSING
01400 $LOC1 = 0
01500 IF("%X%.CWDT" .LT. $ARG1) THEN $LOC1 = $LOC1 + 1
01600 IF("%X%.CWDP" .LT. $ARG2) THEN $LOC1 = $LOC1 + 1
01700 IF("%X%.CDAP" .GT. $ARG3) THEN $LOC1 = $LOC1 + 1
01800 IF("%X%.CDRP" .GT. $ARG4) THEN $LOC1 = $LOC1 + 1
01900 IF("%X%.CDRST" .GT. $ARG5) THEN $LOC1 = $LOC1 + 1
02000 C    DETERMINES THE NUMBER OF FLAGS
02100 IF("%X%.STARTED" .EQ. OFF .OR. $LOC1 .NE. 5) THEN
   GOTO 2400
02200 IF($LOC1 .EQ. 5 .AND. SECNDS .LE. 300) THEN GOTO 2600
02300 "%X%.COND.TUBE.BYPASS.FLAGS" =
   "%X%.COND.TUBE.BYPASS.FLAGS" + 1
02400 SECNDS = 0
02500 C    DETERMINES TOTAL NUMBER OF SAMPLES
02600 IF("%X%.STARTED" .EQ. OFF) THEN GOTO 2900
02700 IF("%X%.STARTED" .EQ. ON .AND. SECND1 .LE. 300) THEN
   GOTO 3000
02800 "%X%.COND.TUBE.BYPASS.SAMPLES" =
   "%X%.COND.TUBE.BYPASS.SAMPLES" + 1
02900 SECND1 = 0
03000 RETURN
03100 C    CALCULATES THE DAILY PERCENTAGE OF DATA
   WHICH MET THE CRITERIA
03200 IF(TIME .NE. 23:59) THEN GOTO 3700
03300 IF("%X%.COND.TUBE.BYPASS.SAMPLES" .NE. 0) THEN
   GOTO 3600
03400 "%X%.COND.TUBE.BYPASS" = 0
03500 GOTO 3700
03600 "%X%.COND.TUBE.BYPASS" =
   "%X%.COND.TUBE.BYPASS.FLAGS"/   "%X%.COND.TUBE.B
03700 IF(TIME .NE. 00:00) THEN GOTO 4200
03800 SECNDS = 0
03900 SECND1 = 0
04000 "%X%.COND.TUBE.BYPASS.FLAGS" = 0
04100 "%X%.COND.TUBE.BYPASS.SAMPLES" = 0
04200 C    END OF PROGRAM
04300 GOTO 100
```

The sub module 220 is configured to provide data which may be used to determine the health of the chilled water flow rate. Reduced flow may occur as a result of dirty or plugged strainers, closed valves, improperly sized piping, improperly adjusted flow control, plugged tubes or improperly performing pumps. Air in the condenser water circuit will also cause a low water flow rate.

In the event such a condition develops, then, for a given partial load level, the chilled water differential pressure, the evaporator refrigerant pressure, and the evaporator refrigerant saturation temperature will be lower than the design values for the particular partial load. Additionally, the chilled water differential temperature and the evaporator approach will be higher than the design value for the particular partial load.

In one embodiment, the sub module 220 includes the following commands:

```
00100 C       DEFINE CHILLER NAMING CONVENTION
00200 DEFINE (X, "MHS.CHL1")
00300 C       DEFINES THE % LOAD DESIGN CRITERIA VALUE
COMPARISON
00400 IF("%X%.PLOAD" .GT. 25.0 .AND. "%X%.PLOAD" .LE. 35.0)
      THEN GOSUB 1400 "%
00500 IF("%X%.PLOAD" .GT. 35.0 .AND. "%X%.PLOAD" .LE. 45.0)
      THEN GOSUB 1400 "%
00600 IF("%X%.PLOAD" .GT. 45.0 .AND. "%X%.PLOAD" .LE. 55.0)
      THEN GOSUB 1400 "%
00700 IF("%X%.PLOAD" .GT. 55.0 .AND. "%X%.PLOAD" .LE. 65.0)
      THEN GOSUB 1400 "%
00800 IF("%X%.PLOAD" .GT. 65.0 .AND. "%X%.PLOAD" .LE. 75.0)
      THEN GOSUB 1400 "%
00900 IF("%X%.PLOAD" .GT. 75.0 .AND. "%X%.PLOAD" .LE. 85.0)
      THEN GOSUB 1400 "%
01000 IF("%X%.PLOAD" .GT. 85.0 .AND. "%X%.PLOAD" .LE. 95.0)
      THEN GOSUB 1400 "%
01100 IF("%X%.PLOAD" .GT. 95.0) THEN GOSUB 1400
      "%X%.D100.CHWDT","%X%.D100.CHW
01200 GOTO 3200
01300 C       SUBROUTINE FOR CONDITIONS WHICH POINT TO
      LOW CHILLED WATER FLOW
01400 $LOC1 = 0
01500 IF("%X%.CHWDT" .GT. $ARG1) THEN $LOC1 = $LOC1 + 1
01600 IF("%X%.CHWDP" .LT. $ARG2) THEN $LOC1 = $LOC1 + 1
01700 IF("%X%.EVAP" .GT. $ARG3) THEN $LOC1 = $LOC1 + 1
01800 IF("%X%.EVRP" .LT. $ARG4) THEN $LOC1 = $LOC1 + 1
01900 IF("%X%.EVRST" .LT. $ARG5) THEN $LOC1 = $LOC1 + 1
02000 C       DETERMINES THE NUMBER OF FLAGS
02100 IF("%X%.STARTED" .EQ. OFF .OR. $LOC1 .NE. 5) THEN
GOTO 2400
02200 IF($LOC1 .EQ. 5 .AND. SECNDS .LE. 300) THEN GOTO 2600
02300 "%X%.LO.CHW.FLOW.FLAGS" =
      "%X%.LO.CHW.FLOW.FLAGS" + 1 02400 SECNDS = 0
02500 C       DETERMINES TOTAL NUMBER OF SAMPLES
02600 IF("%X%.STARTED" .EQ. OFF) THEN GOTO 2900
02700 IF("%X%.STARTED" .EQ. ON .AND. SECND1 .LE. 300) THEN
GOTO 3000
02800 "%X%.LO.CHW.FLOW.SAMPLES" =
      "%X%.LO.CHW.FLOW.SAMPLES" +     1
02900 SECND1 = 0
03000 RETURN
03100 C       CALCULATES THE DAILY PERCENTAGE OF DATA
WHICH MET THE CRITERIA
03200 IF(TIME .NE. 23:59) THEN GOTO 3700
03300 IF("%X%.LO.CHW.FLOW.SAMPLES" .NE. 0) THEN GOTO
3600
03400 "%X%.LO.CHW.FLOW" = 0
03500 GOTO 3700
03600 "%X%.LO.CHW.FLOW" = "%X%.LO.CHW.FLOW.FLAGS" /
      "%X%.LO.CHW.FLOW.SAMPLES"
03700 IF(TIME .NE. 00:00) THEN GOTO 4200
03800 SECNDS = 0
03900 SECND1 = 0
04000 "%X%.LO.CHW.FLOW.FLAGS" = 0
04100 "%X%.LO.CHW.FLOW.SAMPLES" = 0
04200 C       END OF PROGRAM
04300 GOTO 100
```

The sub module 222 is configured to provide data which may be used to determine the health of the condenser water flow rate. Reduced flow may occur as a result of dirty or plugged strainers, closed valves, improperly sized piping, improperly adjusted flow control, plugged tubes, or improperly performing pumps. Air in the condenser water circuit will also cause a low water flow rate.

In the event such a condition develops, then, for a given partial load level, the condenser water differential pressure will be lower than the design values for the particular partial load. Additionally, the condenser water differential temperature, condenser approach, condenser refrigerant pressure, and condenser refrigerant saturation temperature will be higher than the design value for the particular partial load.

In one embodiment, the sub module 222 includes the following commands:

```
0100 C       DEFINE CHILLER NAMING CONVENTION
00200 DEFINE (X, "MHS.CHL1")
00300 C       DEFINES THE % LOAD DESIGN CRITERIA VALUE
COMPARISON
00400 IF("%X%.PLOAD" .GT. 25.0 .AND. "%X%.PLOAD" .LE. 35.0)
      THEN GOSUB 1400 "%
00500 IF("%X%.PLOAD" .GT. 35.0 .AND. "%X%.PLOAD" .LE. 45.0)
      THEN GOSUB 1400 "%
00600 IF("%X%.PLOAD" .GT. 45.0 .AND. "%X%.PLOAD" .LE. 55.0)
      THEN GOSUB 1400 "%
00700 IF("%X%.PLOAD" .GT. 55.0 .AND. "%X%.PLOAD" .LE. 65.0)
      THEN GOSUB 1400 "%
00800 IF("%X%.PLOAD" .GT. 56.0 .AND. "%X%.PLOAD" .LE. 75.0)
      THEN GOSUB 1400 "%
00900 IF("%X%.PLOAD" .GT. 75.0 .AND. "%X%.PLOAD" .LE. 85.0)
      THEN GOSUB 1400 "%
01000 IF("%X%.PLOAD" .GT. 85.0 .AND. "%X%.PLOAD" .LE. 95.0)
      THEN GOSUB 1400 "%
01100 IF("%X%.PLOAD" .GT. 95.0) THEN GOSUB 1400
      "%X%.D100.CWDT","%X%.D100.CWDP
01200 GOTO 3200
01300 C       SUBROUTINE FOR CONDITIONS WHICH POINT TO
      LOW CONDENSER WATER FLO
01400 $LOC1 = 0
01500 IF("%X%.CWDT" .GT. $ARG1) THEN $LOC1 = $LOC1 + 1
01600 IF("%X%.CWDP" .LT. $ARG2) THEN $LOC1 = $LOC1 + 1
01700 IF("%X%.CDAP" .GT. $ARG3) THEN $LOC1 = $LOC1 + 1
01800 IF("%X%.CDRP" .GT. $ARG4) THEN $LOC1 = $LOC1 + 1
01900 IF("%X%.CDRST" .GT. $ARG5) THEN $LOC1 = $LOC1 + 1
02000 C       DETERMINES THE NUMBER OF FLAGS
02100 IF("%X%.STARTED" .EQ. OFF .OR. $LOC1 .NE. 5) THEN
GOTO 2400
02200 IF($LOC1 .EQ. 5 .AND. SECNDS .LE. 300) THEN GOTO 2600
02300 "%X%.LO.CW.FLOW.FLAGS" =
"%X%.LO.CW.FLOW.FLAGS" + 1
02400 SECNDS = 0
02500 C       DETERMINES TOTAL NUMBER OF SAMPLES
02600 IF("%X%.STARTED" .EQ. OFF) THEN GOTO 2900
02700 IF("%X%.STARTED" .EQ. ON .AND. SECND1 .LE. 300) THEN
GOTO 3000
02800 "%X%.LO.CW.FLOW.SAMPLES" =
"%X%.LO.CW.FLOW.SAMPLES" + 1
02900 SECND1 = 0
03000 RETURN
03100 C       CALCULATES THE DAILY PERCENTAGE OF DATA
WHICH    THE CRITERIA
03200 IF(TIME .NE. 23:59) THEN GOTO 3700
03300 IF("%X%.LO.CW.FLOW.SAMPLES" .NE. 0) THEN GOTO 3600
03400 "%X%.LO.CW.FLOW" = 0
03500 GOTO 3700
03600 "%X%.LO.CW.FLOW" = "%X%.LO.CW.FLOW.FLAGS" /
      "%X%.LO.CW.FLOW.SAMPLES" * 1
03700 IF(TIME .NE. 00:00) THEN GOTO 4200
03800 SECNDS = 0
03900 SECND1 = 0
04000 "%X%.LO.CW.FLOW.FLAGS" = 0
04100 "%X%.LO.CW.FLOW.SAMPLES" = 0
04200 C       END OF PROGRAM
04300 GOTO 100
```

The sub module 224 is configured to provide data which may be used to determine if condenser tubes within the condenser 162 are blocked or fouled. This condition hinders the heat transfer between the water in the tubes and the refrigerant in the shell of the condenser 162. Fouled tubes may be caused by any substance hindering heat transfer including scale (mineral deposits), algae, mud, rust, corrosion, or grease. Condenser tubes foul much more frequently than evaporator tubes, since the latter are part of a closed loop.

In the event such a condition develops, then, for a given partial load level, the condenser water differential pressure will be at or close to the design value for the particular partial load. The condenser water differential temperature, however, will be lower than the design value for the particular partial load. Additionally, condenser approach, condenser refrigerant pressure, and condenser refrigerant saturation temperature will be higher than the design value for the particular partial load.

In one embodiment, the sub module 224 includes the following commands:

```
00100 C      DEFINE CHILLER NAMING CONVENSION
00200 DEFINE (X, "MHS.CHL1")
00300 C      DEFINES THE % LOAD DESIGN CRITERIA VALUE
COMPARISON
00400 IF("%X%.PLOAD" .GT. 25.0 .AND. "%X%.PLOAD" .LE. 35.0)
    THEN GOSUB 1400 '%
00500 IF("%X%.PLOAD" .GT. 35.0 .AND. "%X%.PLOAD" .LE. 45.0)
    THEN GOSUB 1400 '%
00600 IF("%X%.PLOAD" .GT. 45.0 .AND. "%X%.PLOAD" .LE. 55.0)
    THEN GOSUB 1400 '%
00700 IF("%X%.PLOAD" .GT. 55.0 .AND. "%X%.PLOAD" .LE. 65.0)
    THEN GOSUB 1400 '%
00800 IF("%X%.PLOAD" .GT. 65.0 .AND. "%X%.PLOAD" .LE. 75.0)
    THEN GOSUB 1400 '%
00900 IF("%X%.PLOAD" .GT. 75.0 .AND. "%X%.PLOAD" .LE. 85.0)
    THEN GOSUB 1400 '%
01000 IF("%X%.PLOAD" .GT. 85.0 .AND. "%X%.PLOAD" .LE. 95.0)
    THEN GOSUB 1400 '%
01100 IF("%X%.PLOAD" .GT. 95.0) THEN GOSUB 1400
    "%X%.D100.CWDT","%X%.D100.CWDP
01200 GOTO 3200
01300 C      SUBROUTINE FOR CONDITIONS WHICH POINT TO
    FOULED CONDENSER TUBES
01400 $LOC1 = 0
01500 IF("%X%.CWDT" .LT. $ARG1) THEN $LOC1 = $LOC1 + 1
01600 IF("%X%.CWDP" .GT. $ARG2 .AND.
    "%X%.CWDP" .LT. $ARG3)
    THEN $LOC1 = $LOC1
01700 IF("%X%.CDAP" .GT. $ARG4) THEN $LOC1 = $LOC1 + 1
01800 IF("%X%.CDRP" .GT. $ARG5) THEN $LOC1 = $LOC1 + 1
01900 IF("%X%.CDRST" .GT. $ARG6) THEN $LOC1 = $LOC1 + 1
02000 C      DETERMINES THE NUMBER OF FLAGS
02100 IF("%X%.STARTED" .EQ. OFF .OR. $LOC1 .NE. 5) THEN
GOTO 2400
02200 IF($LOC1 .EQ. 5 .AND. SECNDS .LE. 300) THEN GOTO 2600
02300 "%X%.FOUL.COND.TUBES.FLAGS" =
    "%X%.FOUL.COND.TUBES.FLAGS" + 1
02400 SECNDS = 0
02500 C      DETERMINES TOTAL NUMBER OF SAMPLES
02600 IF("%X%.STARTED" .EQ. OFF) THEN GOTO 2900
02700 IF("%X%.STARTED" .EQ. ON .AND. SECND1 .LE. 300) THEN
GOTO 3000
02800 "%X%.FOUL.COND.TUBES.SAMPLES" =
    "%X%.FOUL.COND.TUBES.SAMPLES" + 1
02900 SECND1 = 0
03000 RETURN
03100 C      CALCULATES THE DAILY PERCENTAGE OF DATA
WHICH MET   THE CRITERIA
03200 IF(TIME .NE. 23:59) THEN GOTO 3700
03300 IF("%X%.FOUL.COND.TUBES.SAMPLES" .NE. 0) THEN
GOTO 3600
03400 "%X%.FOUL.COND.TUBES" = 0
03500 GOTO 3700
03600 "%X%.FOUL.COND.TUBES" =
    "%X%.FOUL.COND.TUBES.FLAGS" /
    "%X%.FOUL.COND.TUB
03700 IF(TIME .NE. 00:00) THEN GOTO 4200
03800 SECNDS = 0
03900 SECND1 = 0
04000 "%X%.FOUL.COND.TUBES.FLAGS" = 0
04100 "%X%.FOUL.COND.TUBES.SAMPLES" = 0
04200 C      END OF PROGRAM
04300 GOTO 100
```

The sub module 226 is configured to provide data which may be used to determine if evaporator tubes within the evaporator 164 are blocked or fouled. This condition hinders the heat transfer between the water in the tubes and the refrigerant in the shell of the evaporator 164 in a manner similar to that described above with respect to the condenser 162.

In the event such a condition develops, then, for a given partial load level, the chilled water differential pressure will be at or close to design parameters for the particular partial load. The chilled water differential temperature, the evaporator refrigerant pressure and the evaporator refrigerant saturation temperature, however, will decrease with respect to the design values for the particular partial load. Additionally, the evaporator approach will increase with respect to the design value for the particular partial load.

In one embodiment, the sub module 226 includes the following commands:

```
00100 C      DEFINE CHILLER NAMING CONVENSION
00200 DEFINE (X, "MHS.CHL1")
00300 C      DEFINES THE % LOAD DESIGN CRITERIA VALUE
COMPARISON
00400 IF("%X%.PLOAD" .GT. 25.0 .AND. "%X%.PLOAD" .LE. 35.0)
    THEN GOSUB 1400 '%
00500 IF("%X%.PLOAD" .GT. 35.0 .AND. "%X%.PLOAD" .LE. 45.0)
    THEN GOSUB 1400 '%
00600 IF("%X%.PLOAD" .GT. 45.0 .AND. "%X%.PLOAD" .LE. 55.0)
    THEN GOSUB 1400 '%
00700 IF("%X%.PLOAD" .GT. 55.0 .AND. "%X%.PLOAD" .LE. 65.0)
    THEN GOSUB 1400 '%
00800 IF("%X%.PLOAD" .GT. 65.0 .AND. "%X%.PLOAD" .LE. 75.0)
    THEN GOSUB 1400 '%
00900 IF("%X%.PLOAD" .GT. 75.0 .AND. "%X%.PLOAD" .LE. 85.0)
    THEN GOSUB 1400 '%
01000 IF("%X%.PLOAD" .GT. 85.0 .AND. "%X%.PLOAD" .LE. 95.0)
    THEN GOSUB 1400 '%
01100 IF("%X%.PLOAD" .GT. 95.0) THEN GOSUB 1400
    "%X%.D100.CHWDT","%X%.D100.CHW
01200 GOTO 3200
01300 C      SUBROUTINE FOR CONDITIONS WHICH POINT
    FOULED EVAPORATOR TUBES
01400 $LOC1 = 0
01500 IF("%X%.CHWDT" .LT. $ARG1) THEN $LOC1 = $LOC1 + 1
01600 IF("%X%.CHWDP" .GT. $ARG2 .AND.
    "%X%.CHWDP" .LT. $ARG3)
    THEN     $LOC1 = $LO
01700 IF("%X%.EVAP" .GT. $ARG4) THEN $LOC1 = $LOC1 + 1
01800 IF("%X%.EVRP" .LT. $ARG5) THEN $LOC1 = $LOC1 + 1
01900 IF("%X%.EVRST" .LT. $ARG6) THEN $LOC1 = $LOC1 + 1
02000 C DETERMINES THE NUMBER OF FLAGS
02100 IF("%X%.STARTED" .EQ. OFF .OR. $LOC1 .NE. 5) THEN
GOTO 2400
02200 IF($LOC1 .EQ. 5 .AND. SECNDS .LE. 300) THEN GOTO 2600
02300 "%X%.FOUL.EVAP.TUBES.FLAGS" =
"%X%.FOUL.EVAP.TUBES.FLAGS"   + 1
02400 SECNDS = 0
02500 C      DETERMINES TOTAL NUMBER OF SAMPLES
02600 IF("%X%.STARTED" .EQ. OFF) THEN GOTO 2900
02700 IF("%X%.STARTED" .EQ. ON .AND. SECND1 .LE. 300) THEN
GOTO 3000
02800 "%X%.FOUL.EVAP.TUBES.SAMPLES" =
    "%X%.FOUL.EVAP.TUBES.SAMPLES" + 1
02900 SECND1 = 0
03000 RETURN
03100 C      CALCULATES THE DAILY PERCENTAGE OF DATA
WHICH MET   THE CRITERIA
03200 IF(TIME .NE. 23:59) THEN GOTO 3700
03300 IF("%X%.FOUL.EVAP.TUBES.SAMPLES" .NE. 0) THEN
GOTO 3600
03400 "%X%.FOUL.EVAP.TUBES" = 0
03500 GOTO 3700
03600 "%X%.FOUL.EVAP.TUBES" =
    "%X%.FOUL.EVAP.TUBES.FLAGS" /
    "%X%.FOUL.EVAP.TUB
03700 IF(TIME .NE. 00:00) THEN GOTO 4200
```

-continued

```
03800 SECNDS = 0
03900 SECND1 = 0
04000 "%X%.FOUL.EVAP.TUBES.FLAGS" = 0
04100 "%X%.FOUL.EVAP.TUBES.SAMPLES" = 0
04200 C      END OF PROGRAM
04300 GOTO 100
```

The sub module 228 is configured to provide data which may be used to determine if non-condensable gases are present in the refrigerant system. Generally, temperature and pressure maintained in the condenser 162 allows the refrigerant to change state from a vapor to a liquid by releasing heat to the condenser water. Thus, the refrigerant enters the condenser 162 as a vapor and it leaves the condenser 162 as a liquid. The temperature difference between the refrigerant in its vapor state and its leaving liquid state is normally within 2° F. (1° C.). The presence of non-condensable gases, however, raises the condenser pressure (and corresponding temperature), resulting in a temperature differential greater than 2° F. (1° C.) between the temperature of the refrigerant in the condenser 162 and the temperature of the liquid refrigerant leaving the condenser 162.

Other than the temperature differential, the only indication for the above condition is the run-time of the purge pump. In the event such a condition develops, then, for a given partial load level, the condenser water differential temperature, the condenser water differential pressure and the condenser approach will be at or close to the design values for the particular partial load level. The temperature difference between the condensing gauge temperature and the condensing liquid temperature will be greater than two degrees and the compressor discharge temperature will be greater than the design value for the particular partial load level. Additionally, the purge run time or cycles will be higher than the design purge run time or cycles for the particular partial load level.

In one embodiment, the sub module 228 includes the following commands:

```
00100 C      DEFINE CHILLER NAMING CONVENSION
00200 DEFINE (X, "MHS.CHL1")
00300 C      "PURGE.COUNT" REPRESENTS THE NUMBER OF
00400 C      TIMES THE PURGE PRESSURE EXCEEDED 90 PSI. AT
             THIS PRESSURE THE
00500 C      PURGE UNIT WILL ENERGIZE TO EXHAUST
NONCONSENSABLES    FROM THE CHILLER
00600 C      MOTOR.
00700 IF("%X%.PURGE" .GE. 90) THEN ON($LOC2)
00800 IF("%X%.PURGE" .GT. 80 .AND. $LOC2 .EQ. ON) THEN
GOTO 1300
00900 IF($LOC2 .EQ. OFF) THEN GOTO 1300
01000 "%X%.PURGECOUNT" = "%X%.PURGECOUNT" + 1
01100 $LOC2 = OFF
01200 C      DEFINES THE % LOAD DESIGN CRITERIA VALUE
COMPARISON
01300 IF("%X%.PLOAD" .GT. 25.0 .AND. "%X%.PLOAD" .LE. 35.0)
      THEN GOSUB 2300 "%
01400 IF("%X%.PLOAD" .GT. 35.0 .AND. "%X%.PLOAD" .LE. 45.0)
      THEN GOSUB 2300 "%
01500 IF("%X%.PLOAD" .GT. 45.0 .AND. "%X%.PLOAD" .LE. 55.0)
      THEN GOSUB 2300 "%
01600 IF("%X%.PLOAD" .GT. 55.0 .AND. "%X%.PLOAD" .LE. 65.0)
      THEN GOSUB 2300 "%
01700 IF("%X%.PLOAD" .GT. 65.0 .AND. "%X%.PLOAD" .LE. 75.0)
      THEN GOSUB 2300 "%
01800 IF("%X%.PLOAD" .GT. 75.0 .AND. "%X%.PLOAD" .LE. 85.0)
      THEN GOSUB 2300 "%
01900 IF("%X%.PLOAD" .GT. 85.0 .AND. "%X%.PLOAD" .LE. 95.0)
      THEN GOSUB 2300 "%
```

-continued

```
02000 IF("%X%.PLOAD" .GT. 95.0) THEN GOSUB 2300
      "%X%.D100.CWDT.LO","%X%.D100.C
02100 GOTO 5000
02200 C      SUBROUTINE FOR CONDITIONS WHICH POINT TO
             NON-CONDENSABLES IN THE
02300 $LOC1 = 0
02400 IF("%X%.CWDT" .GT. $ARG1 .AND.
      "%X%.CWDT" .LT. $ARG2) THEN $LOC1 = $LOC1
02500 IF("%X%.CWDP" .GT. $ARG3 .AND.
      "%X%.CWDP" .LT. $ARG4) THEN $LOC1 = $LOC1
02600 IF("%X%.CDAP" .GT. $ARG5 .AND.
      "%X%.CDAP" .LT. $ARG6) THEN $LOC1 = $LOC1
02700 IF("%X%.CDRP" .GT. $ARG7) THEN $LOC1 = $LOC1 + 1
02800 IF("%X%.CDT" .GT. $ARG8) THEN $LOC1 = $LOC1 + 1
02900 C      DETERMINES IF PURGE CYCLE IS PRESENT
03000 IF("%X%.PURGE.AVAL" .EQ. ON) THEN GOTO 3800
03100 C      DETERMINES THE NUMBER OF FLAGS IF PURGE
CYCLE IS NOT PRESENT
03200 IF("%X%.STARTED" .EQ. OFF .OR. $LOC1 .LT. 5) THEN
GOTO 3500
03300 IF($LOC1 .GE. 5 .AND. SECNDS .LE. 300) THEN GOTO 3600
03400 "%X%.NONCONDENSABLES.FLAGS" =
      "%X%.NONCONDENSABLES.FLAGS" + 1
03400 "%X%.NONCONDENSABLES.FLAGS" =
      "%X%.NONCONDENSABLES.FLAGS" + 1
03500 SECNDS = 0
03600 GOTO 4400
03700 C      DETERMINES THE NUMBER OF FLAGS IF PURGE IS
             CYCLE PRESENT
03800 IF("%X%.PURGECOUNT" .GE. "%X%.PURGECOUNT.SP")
THEN $LOC1 =      $LOC1 + 1
03900 IF("%X%.STARTED" .EQ. OFF .OR. $LOC1 .LT. 6) THEN
GOTO 4200
04000 IF($LOC1 .GE. 6 .AND. SECND2 .LE. 300) THEN GOTO 4400
04100 "%X%.NONCONDENSABLES.FLAGS" =
      "%X%.NONCONDENSABLES.FLAGS" + 1
04200 SECND2 = 0
04300 C      DETERMINES TOTAL NUMBER OF SAMPLES
04400 IF("%X%.STARTED" .EQ. OFF) THEN GOTO 4700
04500 IF("%X%.STARTED" .EQ. ON .AND. SECND1 .LE. 300) THEN
GOTO 4800
04600 "%X%.NONCONDENSABLES.SAMPLES" =
      "%X%.NONCONDENSABLES.SAMPLES" + 1
04700 SECND1 = 0
04800 RETURN
04900 C      CALCULATES THE DAILY PERCENTAGE OF DATA
WHICH MET    THE CRITERIA
05000 IF(TIME .NE. 23:59) THEN GOTO 5500
05100 IF("%X%.NONCONDENSABLES.SAMPLES" .NE. 0) THEN
GOTO 5400
05200 "%X%.NONCONDENSABLES" = 0
05300 GOTO 5500
05400 "%X%.NONCONDENSABLES" =
      "%X%.NONCONDENSABLES.FLAGS" /
      "%X%.NONCONDENSABL
05500 IF(TIME .NE. 00:00) THEN GOTO 6200
05600 SECNDS = 0
05700 SECND1 = 0
05800 SECND2 = 0
05900 "%X%.PURGECOUNT" = 0
06000 "%X%.NONCONDENSABLES.FLAGS" = 0
06100 "%X%.NONCONDENSABLES.SAMPLES" = 0
06200 C      END OF PROGRAM
06300 GOTO 100
```

The sub module 230 is configured to provide data which may be used to determine if there is a low refrigerant level in the system. Low refrigerant levels may result from a leak or from refrigerant building up or "stacking" in the condenser 162. Conditions leading to stacking include a condenser water temperature that is below the manufacturer's minimum design value.

Refrigerant stacking in the condenser will not drive the condenser pressure up. Rather, the temperature in the condenser 162 will sub cool to nearly the entering condenser water temperature. In the event such a condition develops, then, for a given partial load level, the chilled water differential pressure will be at or close to the design values for the particular partial load level. The chilled water differential temperature, the evaporator pressure, the compressor motor current and the evaporator refrigerant saturation temperature will be lower than the design value for the particular partial load level. Additionally, the evaporator approach and compressor discharge temperature will be higher than the design value for the particular partial load level.

In one embodiment, the sub module 230 includes the following commands:

```
00100 C     DEFINE CHILLER NAMING CONVENSION
00200 DEFINE (X, "MHS.CHL1")
00300 C     DEFINES THE % LOAD DESIGN CRITERIA VALUE
COMPARISON
00400 IF("%X%.PLOAD" .GT. 25.0 .AND. "%X%.PLOAD" .LE. 35.0)
      THEN GOSUB 1400 "%
00500 IF("%X%.PLOAD" .GT. 35.0 .AND. "%X%.PLOAD" .LE. 45.0)
      THEN GOSUB 1400 "%
00600 IF("%X%.PLOAD" .GT. 45.0 .AND. "%X%.PLOAD" .LE. 55.0)
      THEN GOSUB 1400 "%
00700 IF("%X%.PLOAD" .GT. 55.0 .AND. "%X%.PLOAD" .LE. 65.0)
      THEN GOSUB 1400 "%
00800 IF("%X%.PLOAD" .GT. 65.0 .AND. "%X%.PLOAD" .LE. 75.0)
      THEN GOSUB 1400 "%
00900 IF("%X%.PLOAD" .GT. 75.0 .AND. "%X%.PLOAD" .LE. 85.0)
      THEN GOSUB 1400 "%
01000 IF("%X%.PLOAD" .GT. 85.0 .AND. "%X%.PLOAD" .LE. 95.0)
      THEN GOSUB 1400 "%
01100 IF("%X%.PLOAD" .GT. 95.0) THEN GOSUB 1400
      "%X%.D100.CHWDT","%X%.D100.CHW
01200 GOTO 3400
01300 C     SUBROUTINE FOR CONDITIONS WHICH POINT TO
      LOW REFRIGERANT LEVELS
01400 $LOC1 = 0
01500 IF("%X%.CHWDT" .LT. $ARG1) THEN $LOC1 = $LOC1 + 1
01600 IF("%X%.CHWDP" .GT. $ARG2 .AND.
      "%X%.CHWDP" .LT. $ARG3)
THEN       $LOC1 = $LO
01700 IF("%X%.EVAP" .GT. $ARG4) THEN $LOC1 = $LOC1 + 1
01800 IF("%X%.EVRP" .LT. $ARG5) THEN $LOC1 = $LOC1 + 1
01900 IF("%X%.CDT" .GT. $ARG6) THEN $LOC1 = $LOC1 + 1
02000 IF("%X%.EVRST" .LT. $ARG7) THEN $LOC1 = $LOC1 + 1
02100 IF("%X%.CURRENT" .LT. $ARG8) THEN $LOC1 = $LOC1 + 1
02200 C     DETERMINES THE NUMBER OF FLAGS
02300 IF("%X%.STARTED" .EQ. OFF .OR. $LOC1 .NE. 7) THEN
GOTO 2600
02400 IF($LOC1 .EQ. 7 .AND. SECNDS .LE. 300) THEN GOTO 2800
02500 "%X%.LO.REF.LVL.FLAGS" =
"%X%.LO.REF.LVL.FLAGS" + 1
02600 SECNDS = 0
02700 C     DETERMINES TOTAL NUMBER OF
LO.REF.LVL.SAMPLES
02800 IF("%X%.STARTED" .EQ. OFF) THEN GOTO 3100
02900 IF("%X%.STARTED" .EQ. ON .AND. SECND1 .LE. 300) THEN
GOTO 3200
03000 "%X%.LO.REF.LVL.SAMPLES" =
"%X%.LO.REF.LVL.SAMPLES" + 1
03100 SECND1 = 0
03200 RETURN
03300 C     CALCULATES THE DAILY PERCENTAGE OF DATA
WHICH MET   THE CRITERIA
03400 IF(TIME .NE. 23:59) THEN GOTO 3900
03500 IF("%X%.LO.REF.LVL.SAMPLES" .NE. 0) THEN GOTO 3800
03600 "%X%.LO.REF.LVL" = 0
03700 GOTO 3900
03800 "%X%.LO.REF.LVL" = "%X%.LO.REF.LVL.FLAGS" /
      "%X%.LO.REF.LVL.SAMPLES" * 1
03900 IF(TIME .NE. 00:00) THEN GOTO 4400
04000 SECNDS = 0
04100 SECND1 = 0
04200 "%X%.LO.REF.LVL.FLAGS" = 0
04300 "%X%.LO.REF.LVL.SAMPLES" = 0
04400 C     END OF PROGRAM
04500 GOTO 100
```

The sub module 232 is configured to provide data which may be used to determine chiller oil conditions. Oil used in the refrigerant cycle lubricates the moving parts of the compressor 166 and also acts as a cooling medium, removing the heat of friction from the compressor bearings. High and low oil temperature, as well as low oil pressure, are safety cutouts for the chiller 160. If the oil exceeds these safety limits, these cutouts will stop the compressor 166 automatically.

The oil temperature can get too high if loss of oil cooling occurs or if a bearing failure causes excessive heat generation. The oil temperature can get too low if an oil heater failure occurs. A low oil temperature cutout will also prevent the compressor 166 from starting after a prolonged shutdown, and before the oil heaters have had time to drive off the refrigerant dissolved in the oil. The oil pressure can get too low if oil filters become clogged, oil passageways become blocked, there is a loss of oil, or if the oil pump fails. This cutout shuts down the compressor 166 when oil pressure drops below a minimum safe value or if sufficient oil pressure is not developed shortly after compressor startup.

Another potential condition related to the chiller oil is excessive oil in the evaporator 164. When the chiller 160 is operating properly, a small amount of oil mixes and travels with the refrigerant through the entire chiller 160, from the compressor 166 to the condenser 162 to the evaporator 164 and back to the compressor crankcase before that segment of the system is pumped short of oil. The oil is not always properly moved from the evaporator 164 through the suction line back to the compressor 166. When this does not occur, the evaporator 164 becomes oil-logged, decreasing the heat transfer surface of the cooling coil and thus the chiller efficiency.

Accordingly, oil conditions present observables which are similar to those for low refrigerant in the system, as well as fouled evaporator tubes. Thus, when oil conditions arise, the temperature drop between the chilled water return header 174 and the chilled water supply header 172 along with refrigerant pressure decrease while the approach temperature increases. In some cases, the refrigerant liquid temperature and the compressor discharge temperature may be less than the design limit.

In the event such a condition develops, then, for a given partial load level, the chilled water differential pressure will be at or close to the design values for the particular partial load level. The chilled water differential temperature, the evaporator refrigerant pressure, the compressor discharge temperature and the evaporator refrigerant saturation temperature will be lower than the design value for the particular partial load level. Additionally, the evaporator approach will be higher than the design value for the particular partial load level.

In one embodiment, the sub module 232 includes the following commands for determining if there is excessive oil in the evaporator:

```
00100 C     DEFINE CHILLER NAMING CONVENTION
00200 DEFINE (X, "MHS.CHL1")
00300 C     DEFINES THE % LOAD DESIGN CRITERIA VALUE
COMPARISON
00400 IF("%X%.PLOAD" .GT. 25.0 .AND. "%X%.PLOAD" .LE. 35.0)
      THEN GOSUB 1400 "%
00500 IF("%X%.PLOAD" .GT. 35.0 .AND. "%X%.PLOAD" .LE. 45.0)
      THEN GOSUB 1400 "%
00600 IF("%X%.PLOAD" .GT. 45.0 .AND. "%X%.PLOAD" .LE. 55.0)
      THEN GOSUB 1400 "%
00700 IF("%X%.PLOAD" .GT. 55.0 .AND. "%X%.PLOAD" .LE. 65.0)
      THEN GOSUB 1400 "%
```

-continued

```
00800 IF("%X%.PLOAD" .GT. 65.0 .AND. "%X%.PLOAD" .LE. 75.0)
    THEN GOSUB 1400 "%
00900 IF("%X%.PLOAD" .GT. 75.0 .AND. "%X%.PLOAD" .LE. 85.0)
    THEN GOSUB 1400 "%
01000 IF("%X%.PLOAD" .GT. 85.0 .AND. "%X%.PLOAD" .LE. 95.0)
    THEN GOSUB 1400 "%
01100 IF("%X%.PLOAD" .GT. 95.0) THEN GOSUB 1400
    "%X%.D100.CHWDT","%X%.D100.CHW
01200 GOTO 3300
01300 C    SUBROUTINE FOR CONDITIONS WHICH POINT TO
    OIL IN THE EVAPORATOR
01400 $LOC1 = 0
01500 IF("%X%.CHWDT" .LT. $ARG1) THEN $LOC1 = $LOC1 + 1
01600 IF("%X%.CHWDP" .GT. $ARG2 .AND.
    "%X%.CHWDP" .LT. $ARG3)
THEN    $LOC1 = $LO
01700 IF("%X%.EVAP" .GT. $ARG4) THEN $LOC1 = $LOC1 + 1
01800 IF("%X%.EVRP" .LT. $ARG5) THEN $LOC1 = $LOC1 + 1
01900 IF("%X%.CDT" .LT. $ARG6) THEN $LOC1 = $LOC1 + 1
02000 IF("%X%.EVRST" .LT. $ARG7) THEN $LOC1 = $LOC1 + 1
02100 C    DETERMINES THE NUMBER OF FLAGS
02200 IF("%X%.STARTED" .EQ. OFF .OR. $LOC1 .NE. 6) THEN
GOTO 2500
02300 IF($LOC1 .EQ. 6 .AND. SECNDS .LE. 300) THEN GOTO 2700
02400 "%X%.OIL.IN.EVAP.FLAGS" =
"%X%.OIL.IN.EVAP.FLAGS" + 1
02500 SECNDS = 0
02600 C    DETERMINES TOTAL NUMBER OF SAMPLES
02700 IF("%X%.STARTED" .EQ. OFF) THEN GOTO 3000
02800 IF("%X%.STARTED" .EQ. ON .AND. SECND1 .LE. 300) THEN
GOTO 3100
02900 "%X%.OIL.IN.EVAP.SAMPLES" =
"%X%.OIL.IN.EVAP.SAMPLES" + 1
03000 SECND1 = 0
03100 RETURN
03200 C    CALCULATES THE DAILY PERCENTAGE OF DATA
WHICH MET  THE CRITERIA
03300 IF(TIME .NE. 23:59) THEN GOTO 3800
03400 IF ("%X%.OIL.IN.EVAP.SAMPLES" .NE. 0) THEN GOTO 3700
03500 "%X%.OIL.IN.EVAP" = 0
03600 GOTO 03600
03700 "%X%.OIL.IN.EVAP" = ("%X%.OIL.IN.EVAP.FLAGS" /
    "%X%.OIL.IN.EVAP.SAMPLES"
03800 IF(TIME .NE. 00:00) THEN GOTO 4300
03900 SECNDS = 0
04000 SECND1 = 0
04100 "%X%.OIL.IN.EVAP.FLAGS" = 0
04200 "%X%.OIL.IN.EVAP.SAMPLES" = 0
04300 C    END OF PROGRAM
04400 GOTO 100
```

Monitoring the health of a system is discussed with reference to the method 240 of FIG. 7. At the step 242, benchmark data is obtained. The benchmark data may be obtained from design values for the system or device from the manufacturer of the system or device. Preferably, however, benchmark data for the system or equipment is obtained during actual operations as this approach develops the most accurate data. It is further preferred to obtain benchmarking data is at a number of different system capacity levels.

In accordance with one embodiment, benchmark data for the chilled water system 158 is obtained at system capacity levels between about 100% and 40%. To obtain the best data, the chilled water system 158 is inspected to ensure that it is operating at peak condition. When this condition has been established, parameters should be collected at various system capacity levels. The table below lists the parameters collected in this example.

TABLE 1

Trended points for Benchmarking

| Description | Point Type | Point Name |
| --- | --- | --- |
| Percent Load | Calculation (PPCL) | CHL#: PLOAD |
| Maximum Capacity | Constant | CHL#: MAXCAP |
| Chilled Water Flow | Constant | CHL#: CHWFLOW |
| Chilled Water Temperature Differential | Calculation | CHL# .CHWDT |
| Chilled Water Pressure Differential | Physical | CHL# .CHWDP |
| Evaporator Water Approach Temperature | Calculation (PPCL) | CHL# .EVAP |
| Evaporator Saturation Temperature | Physical | CHL#: EVAPSAT TEMP |
| Evaporator Refrigerant Pressure | Physical | CHL#: EVAP PRESS |
| Condenser Water Temperature Differential | Calculation | CHL# .CWDT |
| Condenser Water Pressure Differential | Physical | CHL# .CWDP |
| Condenser Water Approach Temperature | Calculation (PPCL) | CHL# .CDAP |
| Condenser Saturation Temperature | Physical | CHL#: CONDSAT TEMP |
| Condenser Refrigerant Pressure | Physical | CHL#: COND PRESS |
| Compressor Discharge Temperature | Physical | CHL#: COMPDISCH T |
| Motor Current | Physical | CHL#: PHA CURR |

While some of the foregoing parameters, such as chilled water flow, chilled water differential pressure, condenser water differential pressure, and maximum chiller capacity, may preferably be collected manually from equipment or facility data, data identified in Table 1 may alternatively be obtained from the sensors in the system through the data network 130.

Initially, the system is configured to run at full load. This may be accomplished by dropping the chilled water temperature setpoint to create a load on the chiller 160. The chiller 160 will gradually respond to the perceived load. Once the chiller 160 has reached a steady state condition, the various parameters are logged or collected. Preferably, the steady state condition is maintained for at least five minutes to obtain a number of different data samples.

After sufficient data has been collected, the chilled water set point may be incrementally raised to replicate system partial loads. In one embodiment, the set point is modified so as to replicate system partial loads in 10% increments from 100% down to about 40%. As with the previous sequence, once the chiller has reached a steady state condition, the various parameters are logged or collected. Preferably, the steady state condition is maintained for at least five minutes to obtain a number of different data samples.

Once all the benchmark data has been collected, the data for the particular system capacity levels is averaged to obtain a benchmark value for each parameter. This benchmark data for each parameter at each of the system capacity levels represents a condition of the chilled water system 158 wherein no degradation of system health has occurred.

Thereafter, at the step 244 the chilled water system 158 is operated in a normal manner. Thus, as the load on the chilled water system 158 fluctuates over a period of time, the controller 108 controls the chilled water system 158 to provide the requisite amount of chilled water at the requisite temperature through the chilled water supply header 172. As the chilled water system 158 operates, data indicative of the operational parameters is obtained at the step 246. This data may be obtained from the sensors 176-210 and communicated to the controller 108 and then through the data network 128 to the supervisory control system 102 and stored in the system database 104 or a temporary storage. Alternatively, data may be manually obtained and entered into the database 104. In one embodiment, the data includes a date/time stamp or is otherwise identifiable with the time the data was obtained.

The operational data is thereafter analyzed at the step 248 to identify data obtained during steady state operations. This analysis may be performed continuously in near real time or the operational data may be stored for later retrieval and analysis. When the process 240 is run in near real time, an analysis window is set to be open-ended. Thus, as data becomes available, the data is analyzed. When the process 240 is run against archived data, a stop time may be identified for the analysis window. In either event, a start time for the analysis window may be identified. In either approach, a minimum data window may be used to ensure that all of the system parameters are stable. In the present example, a steady state data window is identified as five minutes of data that indicates steady state conditions within the chilled water system 158.

As a part of the step 248, the health monitoring program may check to ensure that the steady state conditions are at a sufficiently high level of capacity to ensure the data obtained is valid. By way of example, when a chiller is run below about 40% capacity, the operating parameters are not consistent. Accordingly, operational data obtained while the chiller is running below a 40% load capacity, in this example, are not used for health monitoring.

The data may nonetheless be useful. One use of the data is to identify the amount of time that a chiller is operated at various loads. This information is of use because the efficiency of a particular chiller is highly dependent upon the load at which the chiller is run. At a loading less than about 40% of the chiller load capacity, chillers are very inefficient. Accordingly, for a two chiller system operating at a 60% system load, loading both chillers at 60% is more efficient than loading one chiller at 85% and loading the second chiller to 35%. Accordingly, this data may be used to assist in optimizing the system efficiency.

In one embodiment, a program establishing a minimum level of capacity for execution of the sub modules includes the following:

```
00100 C      DEFINE CHILLER NAMING CONVENSION
00200 DEFINE (X, "MHS.CHL1")
00300 C      DETERMINES IF LOW LOAD CONDITIONS EXIST
00400 $LOC1 = 0
00500 IF("%X%.PLOAD" .LE. 25.0) THEN $LOC1 = $LOC1 + 1
00600 C      DETERMINES THE NUMBER OF FLAGS
00700 IF("%X%.STARTED" .EQ. OFF .OR. $LOC1 .NE. 1) THEN
      GOTO 1000
00800 IF($LOC1 .EQ. 1 .AND. SECNDS .LE. 300) THEN GOTO 1200
00900 "%X%.LOW.LOAD.FLAGS" = "%X%.LOW.LOAD.FLAGS" + 1
01000 SECNDS = 0
01100 C      DETERMINES TOTAL NUMBER OF SAMPLES
```

-continued

```
01200 IF("%X%.STARTED" .EQ. OFF) THEN GOTO 1500
01300 IF("%X%.STARTED" .EQ. ON .AND. SECND1 .LE. 300) THEN
      GOTO 1700
01400 "%X%.LOW.LOAD.SAMPLES"
      = "%X%.LOW.LOAD.SAMPLES" + 1
01500 SECND1 = 0
01600 C      CALCULATES THE DAILY PERCENTAGE OF DATA
      WHICH MET   THE CRITERIA
01700 IF(TIME .NE. 23:59) THEN GOTO 2200
01800 IF("%X%.LOW.LOAD.SAMPLES" .EQ. 0) THEN GOTO 2100
01900 "%X%.LOW.LOAD" = "%X%.LOW.LOAD.FLAGS" /
      "%X%.LOW.LOAD.SAMPLES" * 100
02000 GOTO 2200
02100 "%X%.LOW.LOAD" = 0
02200 IF(TIME .NE. 00:00) THEN GOTO 2700
02300 SECNDS = 0
02400 SECND1 = 0
02500 "%X%.LOW.LOAD.FLAGS" = 0
02600 "%X%.LOW.LOAD.SAMPLES" = 0
02700 C      END OF PROGRAM
02800 GOTO 100
```

If the criteria for a steady state data window are not met, then the process proceeds to the step 250 and waits for additional data. If, however, the criteria for a steady state data window are met, then a steady state data flag is set for the data sample window at the step 252 and at the step 254 the health sub modules are executed as discussed in more detail below. After the health sub modules have been executed, the method proceeds to the step 256.

At the step 256, the method determines if any additional operational data is available for analysis. If more data is available, then the process 240 proceeds to the step 258 and determines if the analysis window is still open. If the data analyzed is the last data available for analysis in the identified analysis window, then the process 240 proceeds to the step 260 and ends. If, however, the analysis window is still open, then the process 240 returns to the step 246 and obtains the additional data and the step 248 is repeated.

If there is no additional data or an insufficient amount of data at the step 256, then the method determines whether or not the system is still being operated at the step 262. If the system is not being operated and there is no additional data, then either the process 240 is being run on archived data and all data has been processed or the process had been running in near real time but the system was just shut down. In either event, there is no further data to evaluate and the process 240 ends at the step 260.

If the system is still being operated at the step 262 the process proceeds to the step 264 and determines if the analysis window is still open. If the data analyzed is the last data available for analysis in the identified analysis window, then the process 240 proceeds to the step 260 and ends. If, however, the analysis window is still open, such as when the process 240 is run in near real time, then the process 240 returns to the step 250 and waits for additional data.

The execution of the health sub modules 216-232 of step 254 are described with reference to the method 270 of FIG. 8. The method 270 initially determines the capacity level at which the system was operated during the steady state sample window identified at the step 248 of FIG. 7 at the step 272. In accordance with this example, benchmark data was obtained in step 242 for system capacity levels from 100% to 40% in 10% increments and the steady state data window identified at the step 248 is correlated with the closest benchmarked capacity level. Thus, operational data obtained while the chilled water system 158 was operating at 74% capacity may be correlated with benchmark data obtained at system capacity level of 70%.

At the step 274, the operational data for the particular sample window are retrieved. If the process 270 is operating on archived data, then data stored in the database 104 for a parameter associated with identifying the condition of the particular health sub module is retrieved. If the process 270 is running in real-time, then the data may be in a temporary storage, register, or the like. The benchmark data for the parameter associated with identifying the condition of the particular health sub module for the capacity level at which the system was operated during the steady state window is retrieved at the step 276. The data is correlated at the step 278 and a comparison flag is set at the step 280.

The method at the step 282 then determines if the parameter data retrieved in the step 274 meets a criterion for a condition being present based upon the benchmark data retrieved at the step 276. If the criterion is not met, then the method skips to the step 286. If the criterion is met, then at the step 284 a parameter flag is set and the method continues to the step 286.

If additional data is available for comparison at the step 286, either for the parameter just analyzed or for another parameter associated with identifying the condition of the particular health sub module, then the system returns to the step 274. If there is no additional data to be analyzed with respect to the condition of the particular health sub module, then the method proceeds to the step 288 and compares the number of comparison flags set at the step 280 with the number of parameter flags set at the step 284. If there are fewer parameter flags than comparison flags, then all of the parameters associated with the condition of the particular health sub module did not meet the criteria for determining that the health condition was present. Accordingly, at the step 290, the steady state data sample window is identified as not having the condition present and the results of the analysis are saved.

If, however, there is an equal number of comparison flags and parameter flags, then all of the parameters associated with the health condition of the particular health sub module met the criteria for determining that the health condition was present. Accordingly, at the step 292, the steady state data sample window is identified as having the health condition present and the results of the analysis are saved. In either event, the method ends at the step 294.

Figure 7:
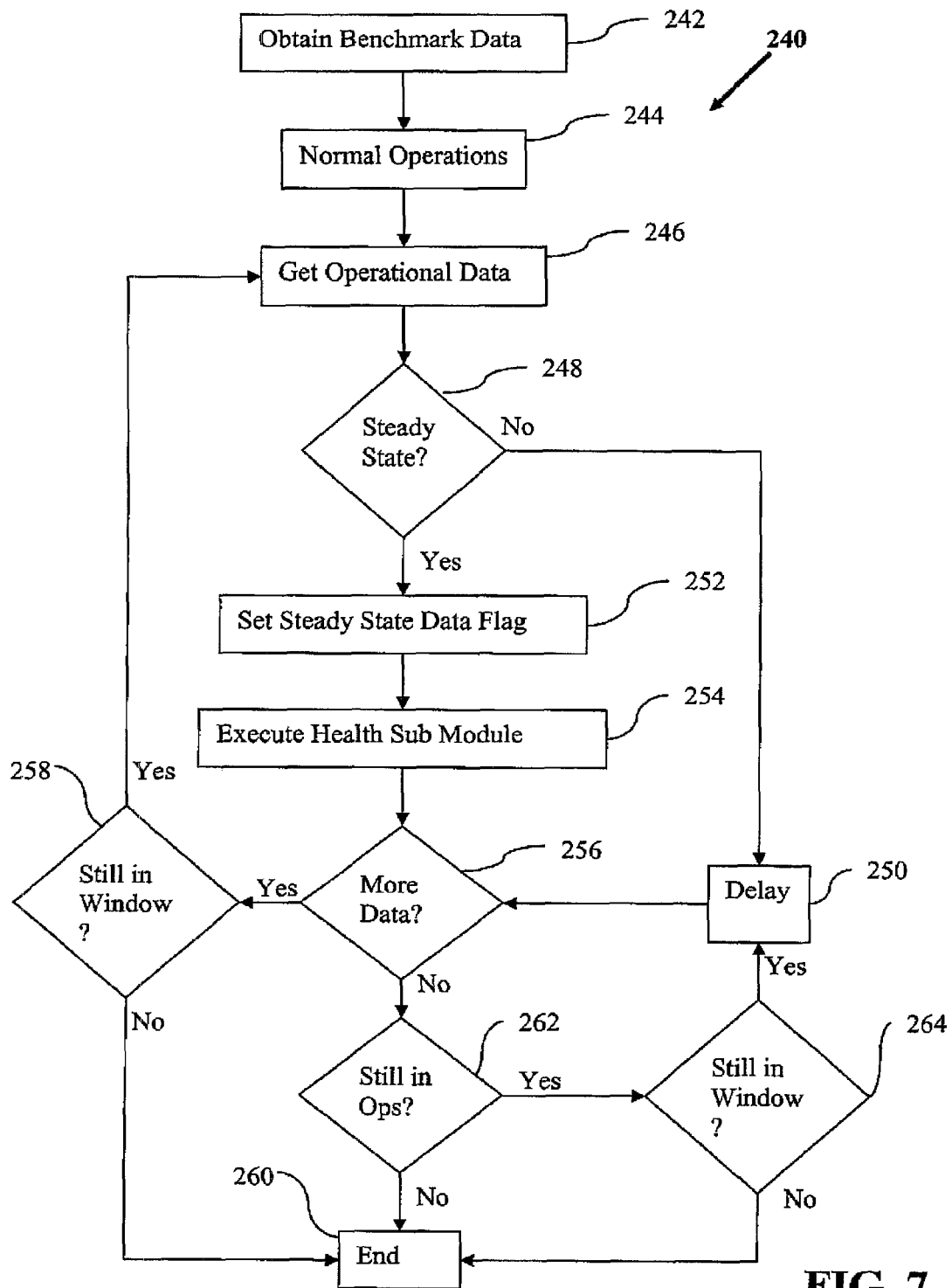
FIG. 7 shows a flow diagram of a method for determining the health of a system in accordance with principles of the present invention.
Figure 8:
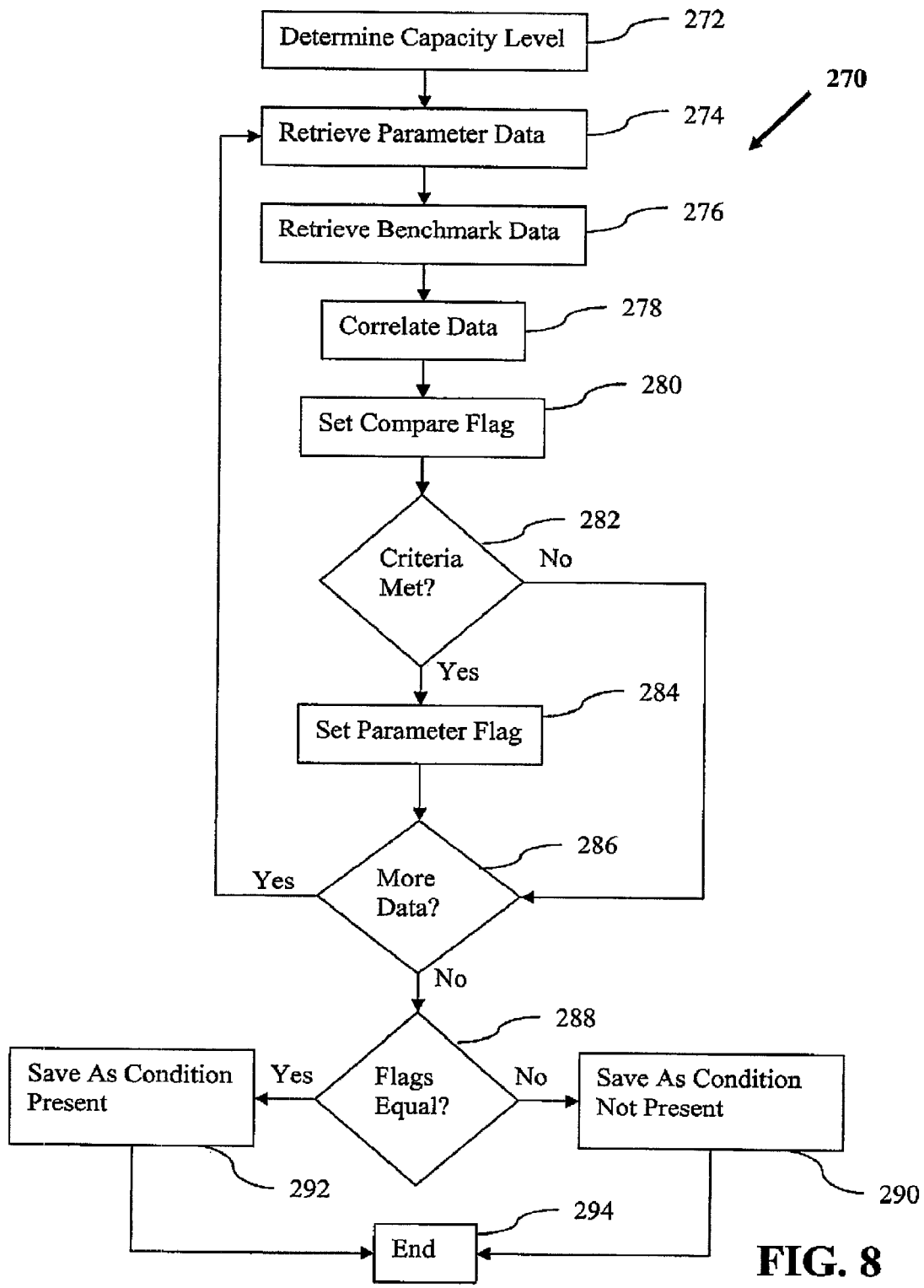
FIG. 8 shows a flow diagram of a health sub module in accordance with principles of the present invention.

The results of the analysis of FIG. 7 and FIG. 8 may be used in a number of ways. For example, the results may be displayed in the form of a print out or a visual display. The results may also be used to provide alarms and/or to facilitate further analysis for a particular condition. The method depicted in FIG. 9 may be used to generate displays and alarms and to facilitate further analysis.

Figure 9:
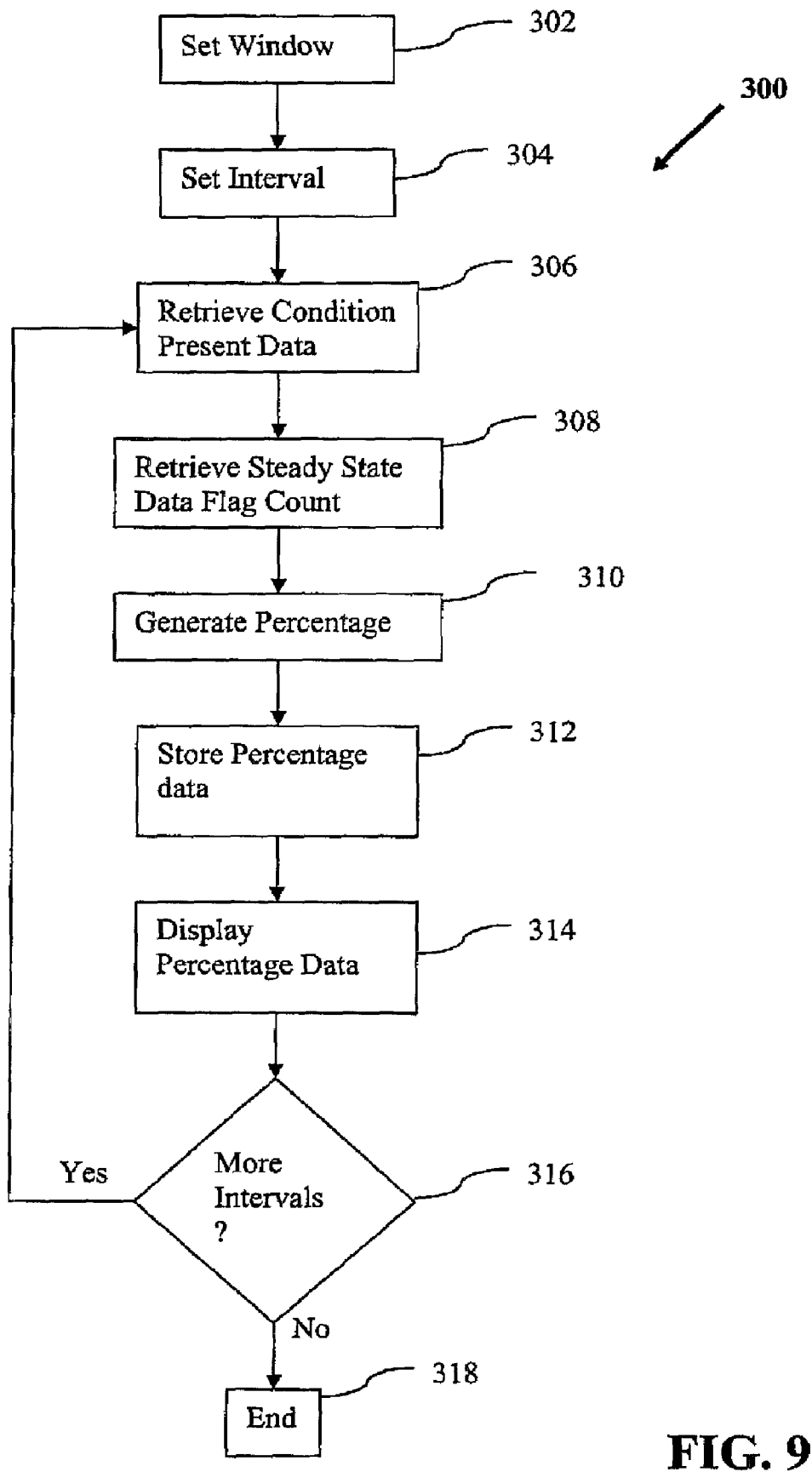
FIG. 9 shows a flow diagram of a method for displaying a condition of a system in accordance with principles of the present invention.

With reference to FIG. 9, the process 300 begins with the step 302 wherein the analysis window for the particular condition which is desired to be trended is identified. When the process 300 is run in real-time, the analysis window set at the step 302 in this embodiment is the same analysis step discussed above with respect to the step 246 of FIG. 7 and the analysis window is set tot be open ended. At the step 304 the granularity or data interval of the display is established. By way of example, an analysis window of two months may be selected with a time interval of one day. The analysis window may be a fixed two month window or the analysis window may be open ended so as to provide near real time data along with the past two months worth of data.

Next, the condition present data for the first interval, which was stored at the step 292 of FIG. 8, is obtained at the step 306. Additionally, the number of steady state data sample windows during the interval is obtained at the step 308. In this embodiment, this is accomplished by determining the number of steady state data flags that were set at the step 252 for data sample windows which occurred during the interval.

At the step 310, the number of condition present data from the step 306 is divided by the number of flags retrieved at the step 308. This generates a percentage of the steady state operating windows during the interval during which all of the parameters indicative of a particular condition were present. This data is stored at the step 312 and at the step 314, the display of the percentage data is updated. If there are additional intervals in the window to be analyzed at the step 316, then the method proceeds to the step 306 and retrieves the condition present data for the next interval. If all of the intervals for the identified window have already been analyzed, the process ends at the step 318.

Figure 10:
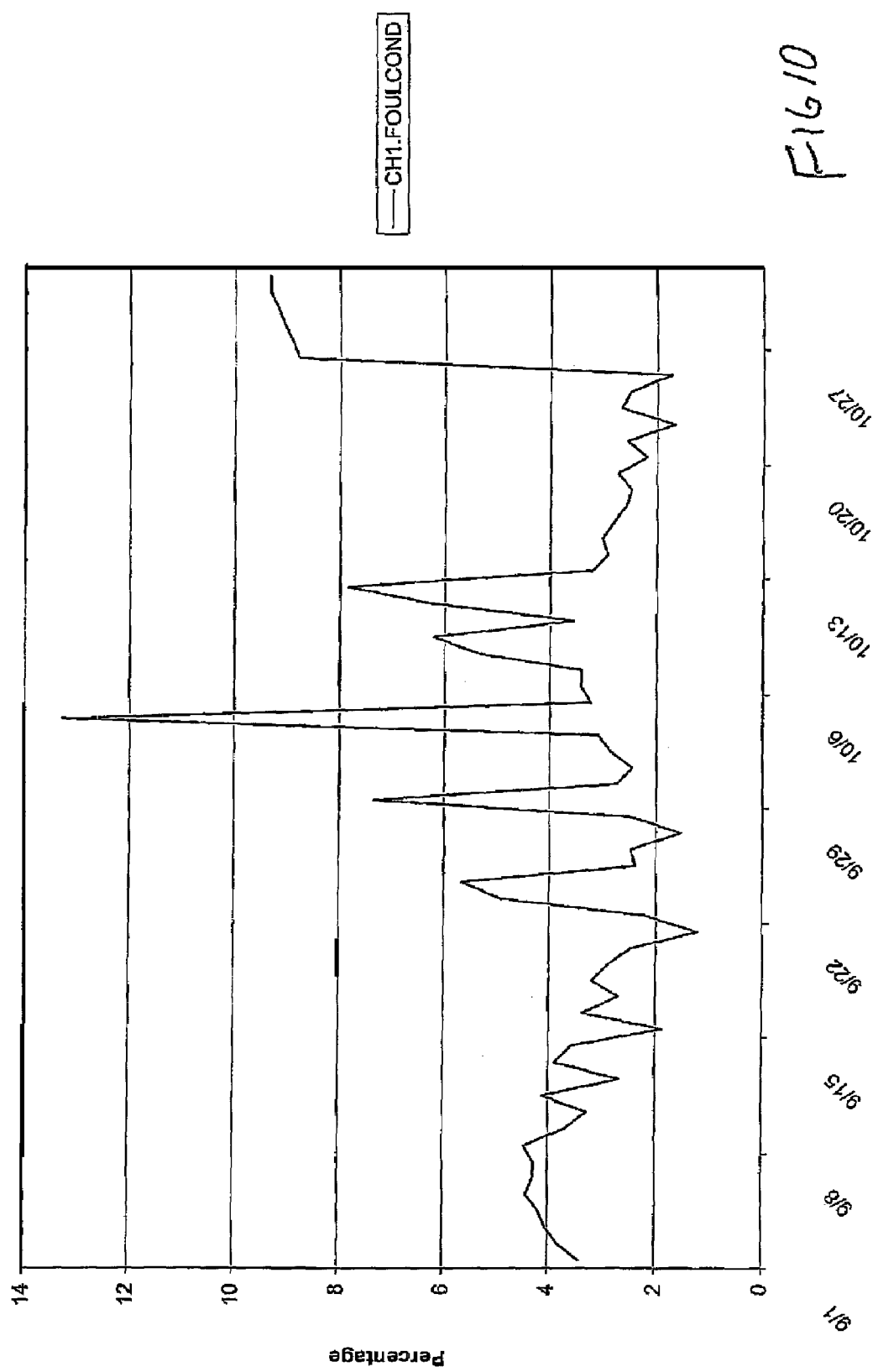
FIGS. 10-13 show various outputs that may be provided by the method of FIG. 9 when various of the health sub modules of FIG. 6 are executed.
Figure 11:
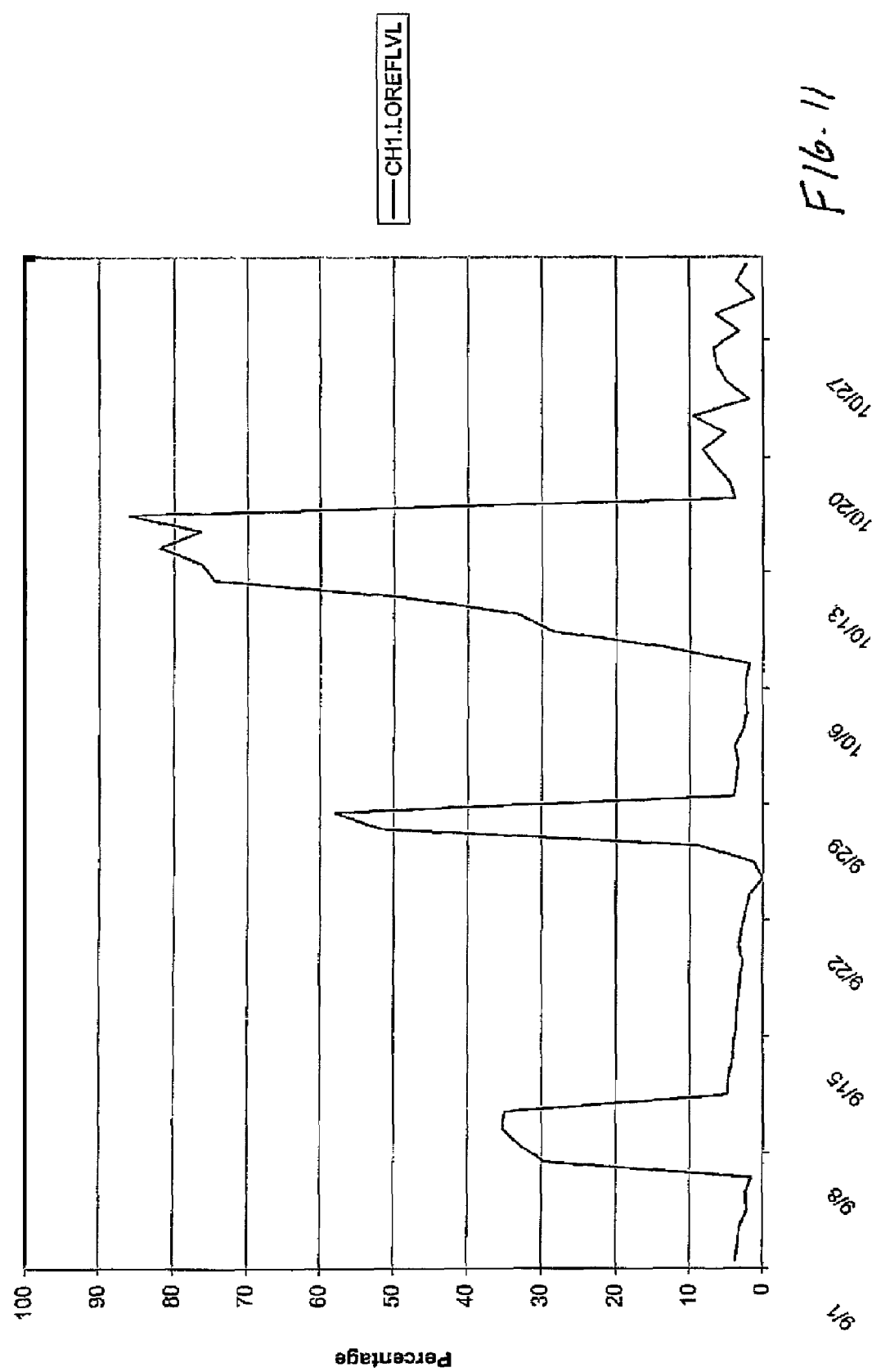
Figure 12:
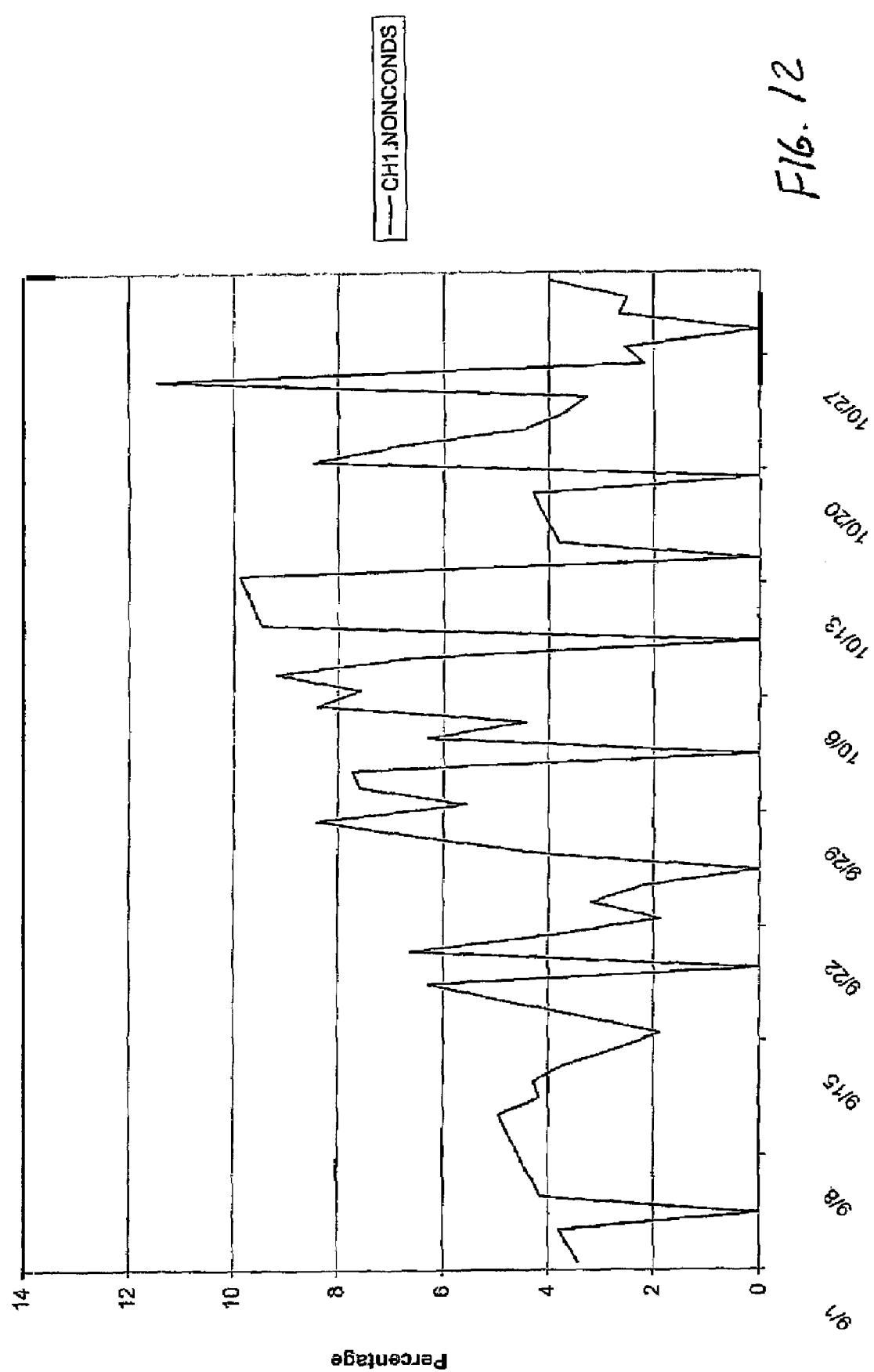
Figure 13:
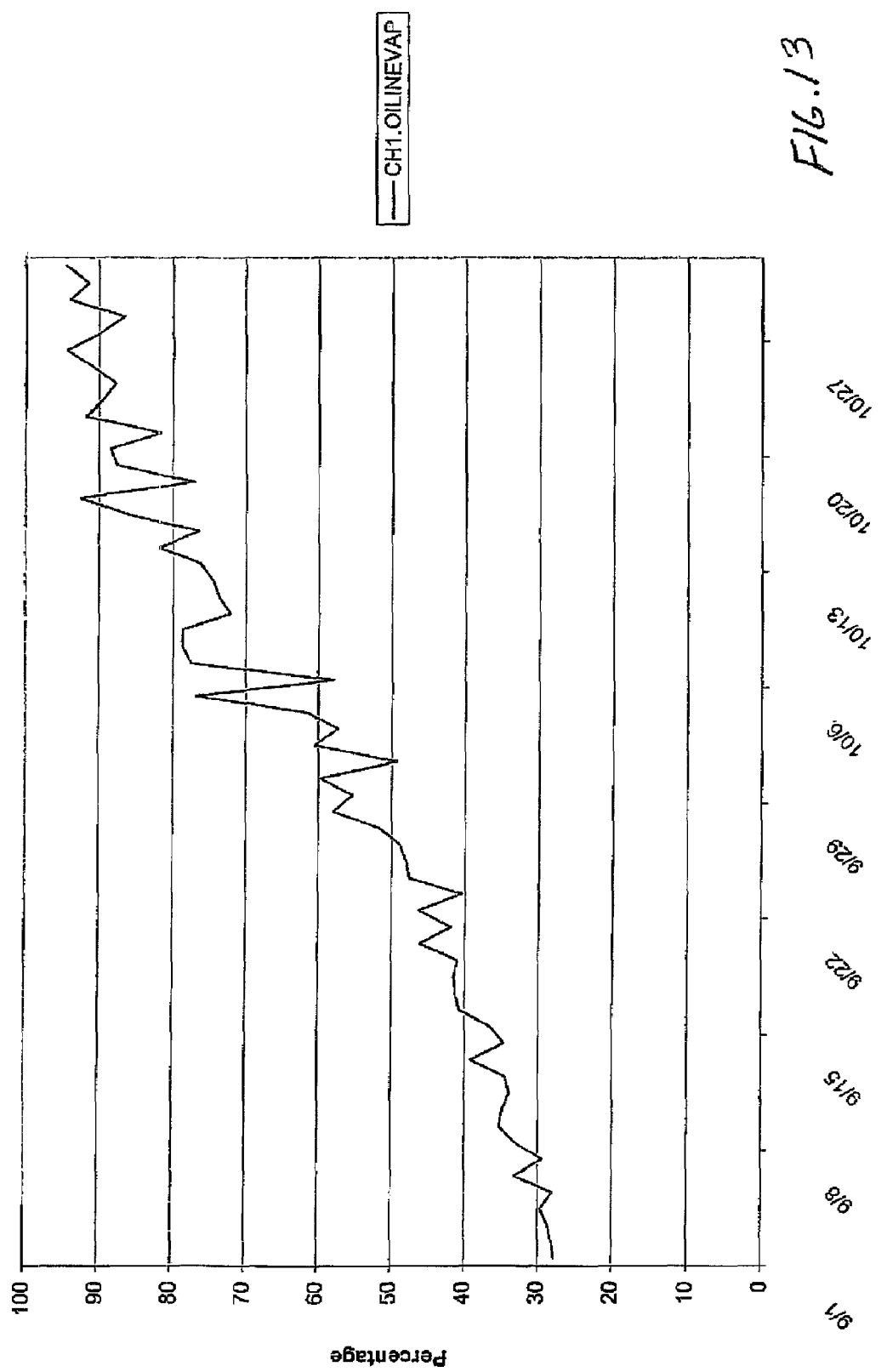

In this embodiment, a display is rendered visually at the supervisory control system in the form of a chart identifying the percentage of data that met the criteria for the particular condition being evaluated. FIGS. 10-13 depict exemplary results of the method of FIG. 9. FIG. 10 depicts a printout of the percentage of daily samples that met the criteria for having fouled condenser tubes. FIG. 11 depicts a printout of the percentage of daily samples that met the criteria for having low refrigerant level. FIG. 12 depicts a printout of the percentage of daily samples that met the criteria for having noncondensables in the system. FIG. 13 depicts a printout of the percentage of daily samples that met the criteria for having oil in the evaporator.

In addition to providing a display, the health monitoring program 214 may be programmed to provide alerts if predetermined percentages of data stored at the step 294 are indicative of a condition. By way of example, a warning may be provided if 70% of the comparisons exceed an acceptance criteria based upon the benchmark data and an alarm may be provided if 90% of the comparisons exceed the acceptance criteria.

Moreover, the display of the health data generated by the health monitoring program as shown in FIGS. 10-13 may be used to understand the condition of a system even if no single parameter exceeds its normal operating range. By way of example, a review of the data presented in FIG. 13 reveals a steady overall upward trend in the percentage of daily samples that met the criteria for having oil in the evaporator. Therefore, even if there has not been an alarm based upon a sensor detecting an out of limits condition, the operators can determine that the system will soon experience such alarms if corrective action is not taken.

It will be appreciated that the above describe embodiments are merely exemplary, and that those of ordinary skill in the art may readily devise their own modifications and implementations that incorporate the principles of the present invention and fall within the spirit and scope thereof.

The invention claimed is:

1. A system for monitoring the health of a system comprising:

a plurality of sensors for obtaining a plurality of data associated with at least one health condition of the system;

a memory for storing the plurality of data and commands, wherein the commands in the memory comprise commands to store, for each of a plurality of system capacity levels, first steady state data for a plurality of parameters associated with the at least one health condition of the system, obtain normal operations data corresponding to the plurality of parameters during a plurality of sample windows during steady state conditions of the system, associate the normal operations data with the first steady state data based upon a sample window system capacity level for each of the plurality of sample windows, compare, for each of the plurality of parameters, the normal operations data with the associated first steady state data, and display the results of the comparison; and a processor for executing the commands.

2. The system of claim 1, wherein the at least one health condition of the system comprises one or more of:
noncondensables in a chiller system;
low refrigerant;
oil in an evaporator;
fouled condenser tubes;
fouled evaporator tubes;
low condenser water flow rate;
low chilled water flow rate;
water bypassing condenser tubes; and
water bypassing evaporator tubes.

3. The system of claim 1, further comprising:
a network operably connecting the plurality of sensors and the processor for communicating the plurality of data associated with the at least one health condition of the system to the processor.

4. The system of claim 1, wherein:
the commands in the memory for comparing comprise commands to identify each of the plurality of sample windows wherein the total number of parameters compared is the same as the total number of parameters indicative of the at least one health condition, and determine the percentage of the plurality of sample windows identified for a plurality of selected intervals; and the commands in the memory for displaying comprise commands to display, for a selected timeframe, the percentage of the plurality of sample windows identified for each of the plurality of selected intervals.

\* \* \* \* \*